(12) United States Patent
Jin et al.

(10) Patent No.: US 11,211,855 B2
(45) Date of Patent: Dec. 28, 2021

(54) DIRECT CURRENT MOTOR

(71) Applicant: UNIVERSITY OF SHANGHAI FOR SCIENCE AND TECHNOLOGY, Shanghai (CN)

(72) Inventors: Aijuan Jin, Shanghai (CN); Shaolong Li, Shanghai (CN)

(73) Assignee: UNIVERSITY OF SHANGHAI FOR SCIENCE AND TECHNOLOGY, Shanghai (CN)

(*) Notice: Subject to any disclaimer, the term of this patent is extended or adjusted under 35 U.S.C. 154(b) by 0 days.

(21) Appl. No.: 17/052,534

(22) PCT Filed: Nov. 8, 2018

(86) PCT No.: PCT/CN2018/114621
§ 371 (c)(1),
(2) Date: Nov. 3, 2020

(87) PCT Pub. No.: WO2019/223253
PCT Pub. Date: Nov. 28, 2019

(65) Prior Publication Data
US 2021/0242762 A1  Aug. 5, 2021

(30) Foreign Application Priority Data

May 22, 2018 (CN) .......................... 201810497428.X
May 22, 2018 (CN) .......................... 201810497429.4
(Continued)

(51) Int. Cl.
*H02K 23/06* (2006.01)
*H02K 1/14* (2006.01)
(Continued)

(52) U.S. Cl.
CPC ............... *H02K 23/06* (2013.01); *H02K 1/14* (2013.01); *H02K 3/18* (2013.01); *H02K 3/28* (2013.01);
(Continued)

(58) Field of Classification Search
CPC .......... H02K 23/06; H02K 1/14; H02K 13/10; H02K 23/08; H02K 23/30; H02K 3/18;
(Continued)

(56) References Cited

U.S. PATENT DOCUMENTS

| | | | |
|---|---|---|---|
| 7,239,063 B2 | 7/2007 | Yamamoto et al. | |
| 2004/0061402 A1* | 4/2004 | Kouda | H02K 3/28 310/208 |

(Continued)

FOREIGN PATENT DOCUMENTS

| CN | 1059238 A | 3/1992 |
|---|---|---|
| CN | 1160944 A | 10/1997 |

(Continued)

OTHER PUBLICATIONS

First Examination Report in Chinese Application No. 201810497428.X issued by CNIPA, dated Oct. 22, 2020.
(Continued)

*Primary Examiner* — Naishadh N Desai
(74) *Attorney, Agent, or Firm* — Zhu Lehnhoff LLP

(57) ABSTRACT

The present invention provides a direct current motor, comprising: a casing; m pairs of brushes fixed within the casing; a stator provided within the casing, including m main poles corresponding to the m pairs of brushes, and n field winding parts; and a rotor provided within the stator, including a plurality of armature windings in a predetermined connection, wherein each pair of main poles includes an S-polarity main pole and an N-polarity main pole; each pair of brushes includes an S-pole corresponding brush corre-
(Continued)

sponding to the S-polarity main pole, and an N-pole corresponding brush corresponding to the N-polarity main pole, the field winding part includes k field winding units, each field winding unit is made up of field coils formed by winding an insulated conductor strip, which is made of a metal wire coated with an insulating layer, around the m pairs of main poles, and m is a positive integer not less than 2, n is 1 or 2, and k is a positive integer not less than 2.

15 Claims, 24 Drawing Sheets

(30) Foreign Application Priority Data

| | | | |
|---|---|---|---|
| May 22, 2018 | (CN) | ......................... | 201810497642.5 |
| May 22, 2018 | (CN) | ......................... | 201810497920.7 |
| May 22, 2018 | (CN) | ......................... | 201810499349.2 |

(51) Int. Cl.

| | |
|---|---|
| *H02K 3/18* | (2006.01) |
| *H02K 3/28* | (2006.01) |
| *H02K 3/30* | (2006.01) |
| *H02K 3/32* | (2006.01) |
| *H02K 5/14* | (2006.01) |
| *H02K 13/10* | (2006.01) |
| *H02K 23/08* | (2006.01) |
| *H02K 23/30* | (2006.01) |

(52) U.S. Cl.
CPC ............... *H02K 3/30* (2013.01); *H02K 3/325* (2013.01); *H02K 5/145* (2013.01); *H02K 13/10* (2013.01); *H02K 23/08* (2013.01); *H02K 23/30* (2013.01)

(58) Field of Classification Search
CPC .. H02K 3/28; H02K 3/30; H02K 3/32; H02K 5/14; H02K 3/325; H02K 5/145
See application file for complete search history.

(56) References Cited

U.S. PATENT DOCUMENTS

| | | | |
|---|---|---|---|
| 2007/0018530 A1* | 1/2007 | Yamamoto ............. | H02K 13/10 |
| | | | 310/239 |
| 2008/0001496 A1* | 1/2008 | Lau ........................ | H02K 23/30 |
| | | | 310/269 |

FOREIGN PATENT DOCUMENTS

| | | |
|---|---|---|
| CN | 107086831 A | 8/2017 |
| CN | 110518769 A | 11/2019 |
| CN | 110518770 A | 11/2019 |
| CN | 110518771 A | 11/2019 |
| CN | 110518772 A | 11/2019 |
| CN | 110518773 A | 11/2019 |
| JP | 2010098930 A | 4/2010 |

OTHER PUBLICATIONS

First Examination Report in Chinese Application No. 201810497429.4 issued by CNIPA, dated Oct. 22, 2020.
First Examination Report in Chinese Application No. 201810497642.5 issued by CNIPA, dated Oct. 22, 2020.
International Search Report in PCT/CN2018/114621, issued by ISA, dated Nov. 28, 2019.
Written Opinion of the International Search Report in PCT/CN2018/114621, issued by ISA, dated Nov. 28, 2019.

\* cited by examiner

DIRECT CURRENT MOTOR

TECHNICAL FIELD

The present invention belongs to the field of motors, and particularly relates to a direct current motor.

BACKGROUND

Direct current motors are classified into series wound direct current motors, shunt wound direct current motors, series-shunt wound direct current motors, shunt-series wound direct current motors and separately excited direct current motors, based on the excitation.

In the case of a series wound direct current motor, the field winding is connected in series to the armature winding, and the torque of the motor is directly proportional to the square of the current. The series wound direct current motor has the advantages of high speed, large starting torque, small size and light weight, and is less likely to have the problem of locked-rotor and is operable with a voltage in a wide range. Moreover, the speed of the motor can be regulated by adjusting the voltage. Therefore, the series wound direct current motor can meet the demands of electric vehicles for quick start, acceleration, gradeability, frequent start/stop, etc., and thus is superior for applications in driving of heavy-load vehicles such as electric trucks, railcars, tourist cars, trucks and ships.

In the case of a shunt wound direct current motor, the field winding is connected in parallel to the armature winding, and the field winding and the armature winding are exposed to the same power supply. The shunt wound direct current motor has the advantages of good performance in speed regulation, large starting torque, and high overload capacity, and is widely applied to rolling mills, electric locomotives, spindle transmission systems of large-size machine tools, and ships.

A series-shunt wound direct current motor is a compound wound direct current motor, and comprises two sets of field windings, namely a series field winding and a shunt field winding. In the series-shunt wound direct current motor, the armature winding is connected in series to the series field winding and then connected in parallel to the shunt field winding. When the magnetic field produced by the shunt field winding is in the same direction with and assists the magnetic field produced by the series field winding, the motor is a cumulative compound direct current motor. The cumulative compound direct current motor integrates the advantages of both the series wound direct current motor and the shunt wound direct current motor, and it has a large starting torque when operates at low speed and is also prevented from the runaway problem when operates under light load, so that it is particularly suitable for the operation condition of cranes, i.e., heavy-load high-torque starting, as it can operate at blow speed operation under heavy load and operate at high speed under light load, thereby ensuring the safety and efficiency of operation. Therefore, the cumulative compound direct current motor is also superior for applications in driving of heavy-load vehicles such as electric trucks, railcars, tourist cars, trucks and ships.

A shunt-series wound direct current motor is a compound wound direct current motor, and comprises two sets of field windings, namely a shunt field winding and a series field winding. In the shunt-series wound direct current motor, the armature winding is connected in parallel to the shunt field winding and then connected in series to the series field winding. When the magnetic field produced by the shunt field winding is in the same direction with and assists the magnetic field produced by the series field winding, the motor is a cumulative compound direct current motor. The cumulative compound direct current motor integrates the advantages of both the series wound direct current motor and the shunt wound direct current motor, and it has a large starting torque when operates at low speed and is also prevented from the runaway problem when operates under light load, so that it is particularly suitable for the operation condition of cranes, i.e., heavy-load high-torque starting, as it can operate at blow speed operation under heavy load and operate at high speed under light load, thereby ensuring the safety and efficiency of operation. Therefore, the cumulative compound direct current motor is also superior for applications in driving of heavy-load vehicles such as electric trucks, railcars, tourist cars, trucks and ships.

In the case of a separately excited direct current motor, the field winding and the armature winding are separately energized from two power supplies, and the field current is separately provided, independent of the armature current. Therefore, the separately excited direct current motor is convenient to control, and its speed regulation, positive inversion, and energy feedback can be easily achieved. The separately excited direct current motor is widely applied to electric forklift trucks, electric vehicles, electric tourist cars, electric tractors, spindle transmission systems of large-size machine tools, ships, etc.

A direct current motor is generally used with a chopper serving as a speed control device of the direct current motor. In order to ensure the reliability of the system, the chopper typically has a maximum output current which is 2 to 3 times of the rated current of the motor. A high-power high-performance direct current motor, especially a low-voltage high-current direct current motor, needs a chopper with a large continuous working current, however, the related technologies and products are controlled and monopolized by some countries and companies, resulting in the high price. Besides, commercially available choppers for high-performance motors can only provide an output current no more than one thousand amperes, which seriously restricts and influences the development of low-voltage high-current direct current motors.

The output voltage and output current of the chopper can be varied by switching a transistor power switch through pulse width modulation, and the amplitude of the ripple of the current is inversely proportional to the switching frequency of the transistor power switch, while the switching frequency of the transistor power switch is directly proportional to the switching loss (or temperature rise and failure rate). However, the ripple of the output torque of the motor is directly proportional to the square of the ripple of the current. Therefore, the switching frequency should be increased to reduce the ripple of the output torque or the ripple of the current of the motor, while the switching frequency also should be reduced to reduce the switching loss. This conflict influences the development of the speed control device of the high-power high-performance direct current motor, resulting in difficulties in application of the direct current motor to CNC machine tools or another device which imposes great restriction on torque ripple.

A direct current motor used for national defense equipment is particularly sensitive to vibration and electromagnetic interference due to the stealth feature, that is to say, the restriction on the ripple of the output torque or the ripple of the current of the motor are particularly strict. However, the conventional series wound direct current motor currently used for high-power national defense electric equipment can hardly resist the increasingly developed detection technology.

For above reasons, development of the high-power direct current motor is restricted and influenced, which further influences the construction of economics and national defense.

SUMMARY OF THE INVENTION

The present invention has been made to solve the aforementioned problems, and an object of the present invention is to provide a direct current motor.

In order to achieve the object, the present invention adopts the following technical scheme:

provided is a direct current motor, connected to at least one direct current power supply, characterized by comprising: a casing; m pairs of brushes fixed within the casing; a stator provided within the casing, including m main poles corresponding to the m pairs of brushes, and n field winding parts; and a rotor provided within the stator, including a plurality of armature windings in a predetermined connection, wherein each pair of main poles includes an S-polarity main pole and an N-polarity main pole; each pair of brushes includes an S-pole corresponding brush corresponding to the S-polarity main pole, and an N-pole corresponding brush corresponding to the N-polarity main pole, the field winding part includes k field winding units, each field winding unit is made up of field coils formed by winding an insulated conductor strip, which is made of a metal wire coated with an insulating layer, around the m pairs of main poles, and m is a positive integer not less than 2, n is 1 or 2, and k is a positive integer not less than 2.

The direct current motor provided by the present invention may be further characterized in that, when n is 1 and k=m, the insulated conductor strip of each field winding unit has one end and the other end, all the one ends of the insulated conductor strips are electrically connected to all the S-pole corresponding brushes in the brushes; or, all the one ends of the insulated conductor strips are electrically connected to all the N-pole corresponding brushes in the brushes, the m the other ends of the insulated conductor strips serve as m first external wiring terminals for electrical connection to the external, and the m brushes, which are not connected with the one ends of the insulated conductor strips, are individually provided with wiring terminals serving as m second external wiring terminals for electrical connection to the external.

The direct current motor provided by the present invention may be further characterized in that, when n is 1 and k=m, the insulated conductor strip of each field winding unit has one end and the other end, all the one ends of the insulated conductor strips are electrically connected to all the S-pole corresponding brushes in the brushes to form first external wiring terminals, while all the other ends are electrically connected to all the N-pole corresponding brushes in the brushes to form second external wiring terminals; or, all the one ends of the insulated conductor strips are electrically connected to all the N-pole corresponding brushes in the brushes to form first external wiring terminals, while all the other ends are electrically connected to all the S-pole corresponding brushes in the brushes to form second external wiring terminals, and the m first external wiring terminals and the m second external wiring terminals are for electrical connection to two electrodes of the direct current power supply, respectively.

The direct current motor provided by the present invention may be further characterized in that, all the field coils on each main pole have the same number of turns.

The direct current motor provided by the present invention may be further characterized in that, when n is 2 and k=m, the stator includes a series field winding part and a shunt field winding part, the series field winding part includes m series field winding units, the shunt field winding part includes m shunt field winding units, each series field winding unit is made up of series field coils made with the insulated conductor strip, each shunt field winding unit is made up of shunt field coils made with the insulated conductor strip, the insulated conductor strip of each series field winding unit has one series end and the other series end, the insulated conductor strip of each shunt field winding unit has one shunt end and the other shunt end, all the one ends of the insulated conductor strips are electrically connected to all the S-pole corresponding brushes in the brushes; or, all the one ends of the insulated conductor strips are electrically connected to all the N-pole corresponding brushes in the brushes, the m one series ends of the series field winding units serve as m first external wiring terminals for electrical connection to one electrode of the external direct current power supply, the m brushes, which are not connected with the one series ends of the series field winding units, are individually provided with wiring terminals serving as m second external wiring terminals for electrical connection to the other electrode of the external direct current power supply, and the m one shunt ends of the shunt field winding units are electrically connected to the m first external wiring terminals, while the m the other shunt ends are electrically connected to the m second external wiring terminals; or, the m one shunt ends of the shunt field winding units are electrically connected to the m second external wiring terminals, while the m the other shunt ends are electrically connected to the m first external wiring terminals.

The direct current motor provided by the present invention may be further characterized in that, when n is 2 and k=m, the stator includes a series field winding part and a shunt field winding part, the series field winding part includes m series field winding units, the shunt field winding part includes m shunt field winding units, each series field winding unit is made up of series field coils made with the insulated conductor strip, each shunt field winding unit is made up of shunt field coils made with the insulated conductor strip, the insulated conductor strip of each series field winding unit has one series end and the other series end, the insulated conductor strip of each shunt field winding unit has one shunt end and the other shunt end, all the one series ends of the series field winding units are electrically connected to all the S-pole corresponding brushes in the brushes to form joint points; or, all the one series ends of the series field winding units are electrically connected to all the N-pole corresponding brushes in the brushes to form joint points, the m the other series ends of the series field winding units serve as m first external wiring terminals for electrical connection to one electrode of the external direct current power supply, the m brushes, which are not connected with the one series ends of the series field winding units, are individually provided with wiring terminals serving as m second external wiring terminals for electrical connection to the other electrode of the external direct current power supply, and the m one shunt ends of the shunt field winding units are electrically connected to the m second external wiring terminals, while the m the other shunt ends are electrically connected to the electrical joint points of the m series field winding units and the brushes; or, the m the other shunt ends of the shunt field winding units are electrically connected to the m second external wiring terminals, while the m one shunt ends are electrically connected to the electrical joint points of the m series field winding units and the brushes.

The direct current motor provided by the present invention may be further characterized in that, the series field coils of the series field winding units on each main pole have the same winding direction and number of turns, and the shunt field coils of the shunt field winding units on each main pole have the same winding direction and number of turns.

The direct current motor provided by the present invention may be further characterized in that, the connection of the multiple series field coils of each series field is any one of series connection, parallel connection, and series-parallel connection, the connections of the multiple series field coils of all the series field winding units are identical, the connection of the multiple shunt field coils of each shunt field winding unit is any one of series connection, parallel connection, and series-parallel connection, and the connections of the multiple shunt field coils of all the shunt field winding units are identical.

The direct current motor provided by the present invention may be further characterized in that, the direct current power supply includes at least one first direct current power supply and at least one second direct current power supply, when n is 1, the insulated conductor strip of each field winding unit has one end and the other end, all the S-pole corresponding brushes or all the N-pole corresponding brushes are individually provided with wiring terminals serving as m first external wiring terminals for electrical connection to one electrode of the first direct current power supply, the rest of the brushes, which are not electrically connected with the first external wiring terminals, are individually provided with wiring terminals serving as m second external wiring terminals for electrical connection to the other electrode of the first direct current power supply, all the one ends of the insulating conductor strips serve as k third external wiring terminals for electrical connection to the one electrode of the second direct current power supply, and all the other ends of the insulated conductor strips serve as k fourth external connection terminals for electrical connection with the other electrode of the second direct current power supply.

The direct current motor provided by the present invention may be further characterized in that, all the field coils on each main pole have the same winding direction and number of turns.

The direct current motor provided by the present invention may be further characterized in that, the connection of the multiple field coils of each field winding unit is any one of series connection, parallel connection, and series-parallel connection, and the connections of the multiple field coils of all the field winding units are identical.

The direct current motor provided by the present invention may be further characterized in that, the insulated conductor strip is any one of an enameled wire and an insulated copper conductor strip.

The direct current motor provided by the present invention may be further characterized in that, the predetermined connection is any one of simplex lap connection, multiplex lap connection, and multiplex wave connection.

The direct current motor provided by the present invention may be further characterized in that, the direct current power supply is any one of a chopper, a battery, and a commutating power supply.

Function and Effect of the Invention

According to the direct current motor provided by the present invention, each pair of main poles includes an S-polarity main pole and an N-polarity main pole, each pair of brushes includes an S-pole corresponding brush corresponding to the S-polarity main pole, and an N-pole corresponding brush corresponding to the N-polarity main pole, the field winding part includes k field winding units, each field winding unit is made up of field coils formed by winding an insulated conductor strip, which is made of a metal wire coated with an insulating layer, around the m pairs of main poles, and m is a positive integer not less than 2, n is 1 or 2, and k is a positive integer not less than 2, so that each field winding unit is structurally independent and can operate independently, that is: the current in each field winding unit is independent, which allows the current in each field winding units to be similar to and staggered by 1/m of the switching cycle from one another, so as to reduce both the ripple and the ripple coefficient of the sum of the currents of the m field winding units, i.e. the field current of the motor. Therefore, on the one hand, the motor suffers less electromagnetic interference; on the other hand, the ripple and the ripple coefficient of the main magnetic field formed by the m field winding units are both reduced, so that the ripple and the ripple coefficient of the output torque of the motor are reduced, thus reducing the ripple and the ripple coefficient of the output speed of the motor as well as the vibration and noise of the motor.

Moreover, since the current of each field winding unit is independent, when some field winding units break down, other field winding units can still work normally, so that the phenomenon that the conventional direct current motor may suddenly run out of control when a field winding breaks down is prevented, and the reliability and safety of the system are improved.

Further, since the current of each field winding unit is independent and is 1/m of the current of the field winding part, when the field winding part has a large rated current, the current of each field winding unit can be correspondingly reduced as long as m is large enough, so that the requirements on the contact resistance and insulation of wires and connectors connected to the field winding units are lowered, thereby reducing the cost and difficulties in the production and manufacturing, and improving the cost performance, reliability and safety of the system.

In summary, the direct current motor of the embodiments of the present invention is simple in structure, uses short connecting lines, and is produced by simple procedures, so that it is easy to manufacture and convenient to maintain, and costs less in both production and maintenance, thus having the advantages of reasonable and simple structure design, high reliability, and high safety. Therefore, the direct current motor is not only applicable to heavy-load electric equipment such as electric vehicles, electric trucks, railcars, tourist cars, trucks and ships, but also applicable to high-performance electric equipment such as numerical control machines and submarines.

DETAILED DESCRIPTION OF THE PREFERRED EMBODIMENTS

The embodiments of the present invention will be described below in connection with the accompanying drawings.

Embodiment 1

Figure 1:
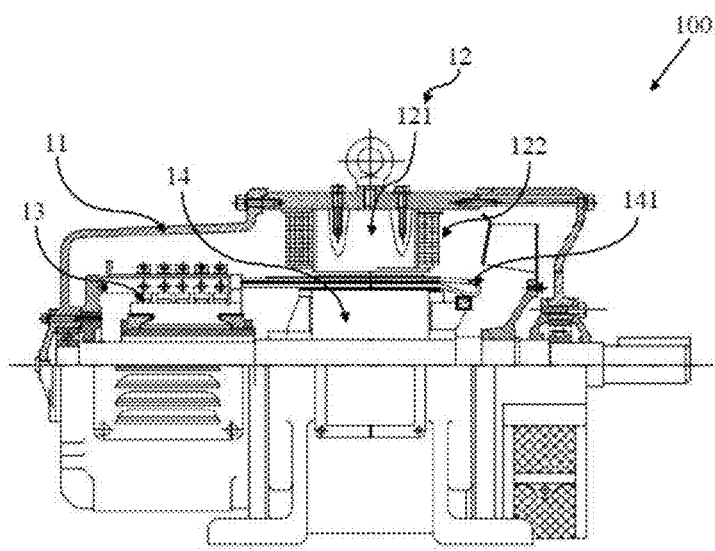
FIG. 1 is a schematic diagram showing the longitudinal section structure of a series wound direct current motor of an embodiment of the present invention.
Figure 2:
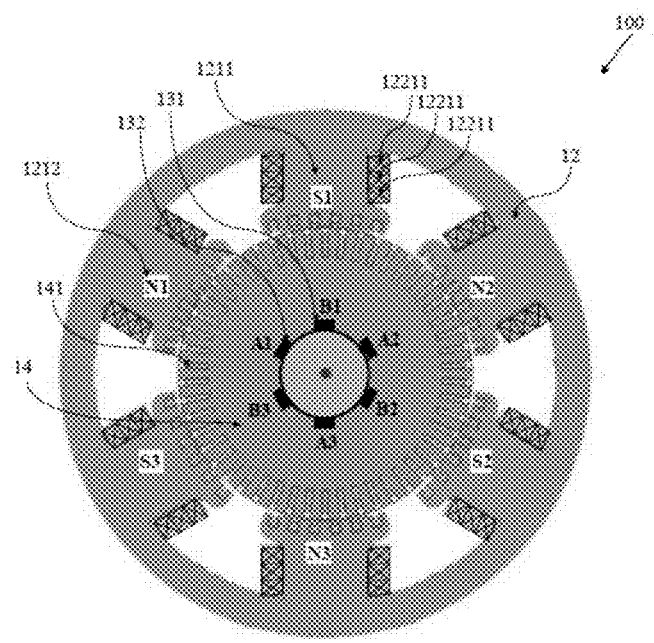
FIG. 2 is a schematic diagram showing the transversal section structure of a series wound direct current motor of an embodiment of the present invention.
Figure 3:
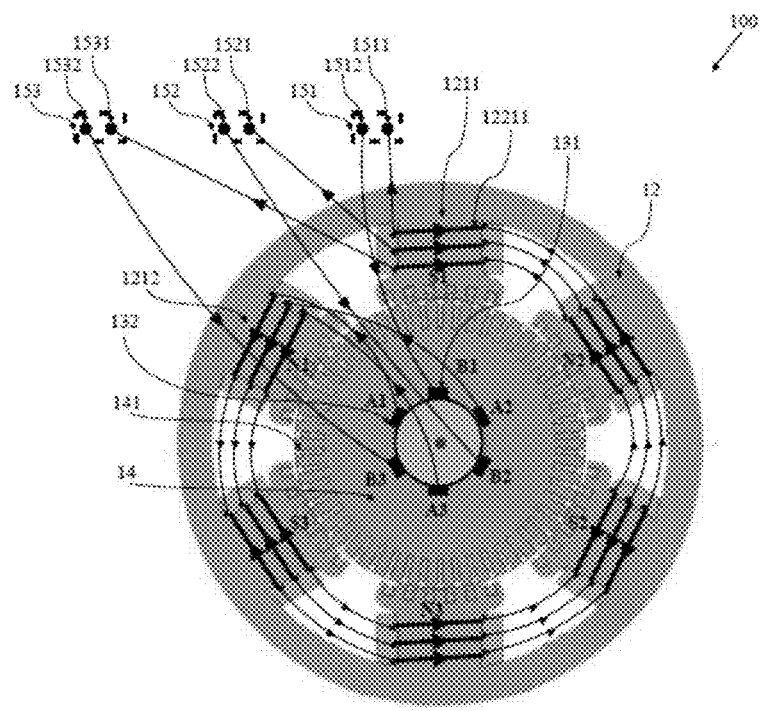
FIG. 3 is a schematic diagram showing circuit connection in the transversal section structure of a series wound direct current motor of an embodiment of the present invention.
Figure 4:
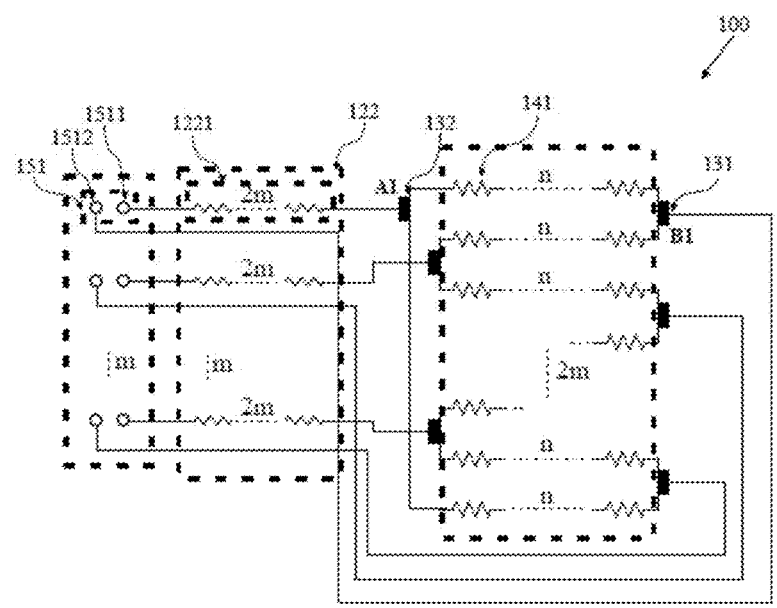
FIG. 4 is a schematic diagram showing circuit connection of armature windings and field windings of a series wound direct current motor of the present invention.
Figure 5:
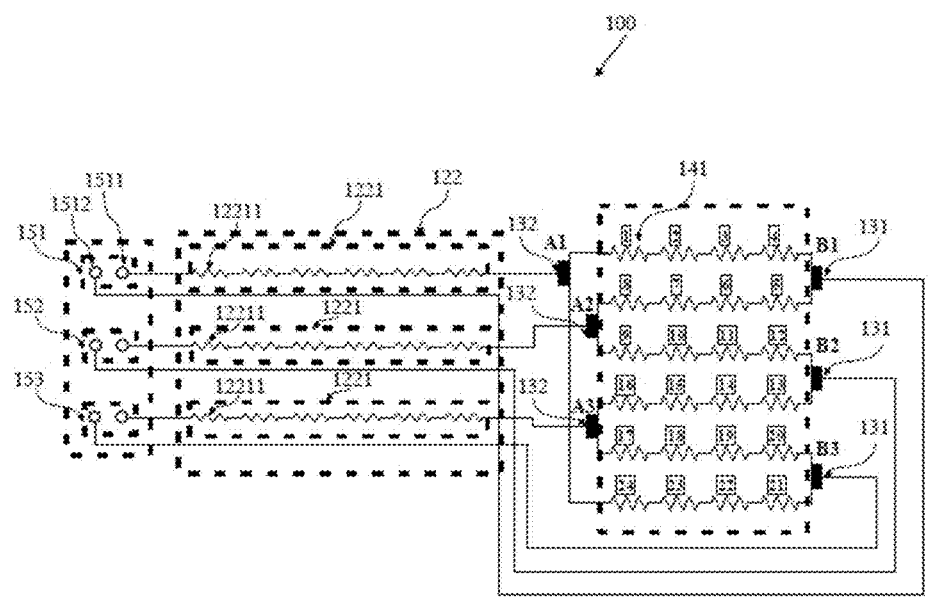
FIG. 5 is a schematic diagram showing circuit connection of armature windings and field windings of a series wound direct current motor of an embodiment of the present invention.
Figure 6:
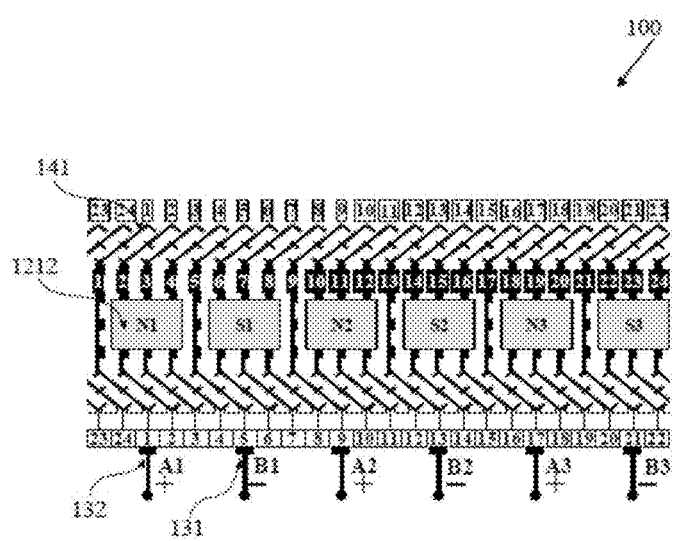
FIG. 6 is an exploded diagram showing simplex lap connection of armature windings of a series wound direct current motor of an embodiment of the present invention.

FIG. 1 is a schematic diagram showing the longitudinal section structure of a series wound direct current motor of an embodiment of the present invention; FIG. 2 is a schematic diagram showing the transversal section structure of a series wound direct current motor of an embodiment of the present invention; FIG. 3 is a schematic diagram showing circuit connection in the transversal section structure of a series wound direct current motor of an embodiment of the present invention; FIG. 4 is a schematic diagram showing circuit connection of armature windings and field windings of a series wound direct current motor of the present invention; FIG. 5 is a schematic diagram showing circuit connection of armature windings and field windings of a series wound direct current motor of an embodiment of the present invention; and FIG. 6 is an exploded diagram showing simplex lap connection of armature windings of a series wound direct current motor of an embodiment of the present invention.

In this embodiment, a direct current motor 100 is a series wound direct current motor, and the direct current motor 100 is connected to an external direct current power supply (not shown), and has a rated input current.

As shown in FIGS. 1 to 3, the direct current motor 100 includes a casing 11, a stator 12, brushes 13, a rotor 14, and a junction box (not shown). As shown in FIG. 4, m pairs of brushes are provided according to the value of the rated input current. As shown in FIGS. 5 and 6, m is set to be 3 in this embodiment. If the contact of the transistor power switch can withstand a maximum output current of $I_1$, and the rated input current of the direct current motor is $I_{max}$, then the count of pairs of the brushes, i.e. m, satisfies the following condition: $m > I_{max}/I_1$.

The stator 12 is provided within the casing 11, and includes three pairs (i.e. six in total) of main poles 121, and a field winding part 122. Three field coils 12211 are provided on each main pole 121, and each field coil 12211 is formed by winding an insulated conductor, which is made of a conductor coated with an insulating layer, around the main pole 121. The insulated conductor strip is any one of an enameled wire and an insulated copper conductor strip, and in this embodiment, the insulated conductor strip is an enameled wire. In this embodiment, the three field coils 12211 on each main pole 121 have the same winding direction and number of turns.

As shown in FIGS. 2 and 3, six field coils 12211, each of which is one of the field coils on each main pole 121, are connected to form a field winding unit 1221 shown in FIG. 5. The field winding part 122 includes three field winding units 1221. The insulated conductor strip of each field winding unit 1221 has one end and the other end, which are distinguished according to a preset current direction of the field coils 12211. Each pair of main poles 121 includes an S-polarity main pole 1211 and an N-polarity main pole 1212 corresponding to the winding direction of the field coils 12211 and the preset current direction of the field coils 12211. In this embodiment, the three field coils 12211 on each main pole 121 have the same winding direction and number of turns.

The connection of the six field coils 12211 of each field winding unit 1221 is any one of series connection, parallel connection, and series-parallel connection, and the connections of the six field coils 12211 of all the field winding units 1221 are identical. In this embodiment, the connection of the six field coils 12211 is series connection.

As shown in FIGS. 1 to 3, three pairs (i.e. six in total) of brushes 13 are provided within the casing 11, and each pair of brushes 13 includes an S-pole corresponding brush 131 corresponding to the S-polarity main pole 1211, and an N-pole corresponding brush 132 corresponding to the N-polarity main pole 1212.

The brushes 13 are any one of narrow brushes and wide brushes, and in this embodiment, the brushes 13 are narrow brushes.

As shown in FIGS. 1 to 3, the rotor 14 is provided within the stator 12, and as shown in FIG. 6, includes a plurality of armature windings 141 in a predetermined connection, and the predetermined connection is any one of simplex lap connection, multiplex lap connection, and multiplex wave connection. In this embodiment, the plurality of armature windings are in a simplex lap connection.

The junction box (not shown) is fixed to the casing 11, and as shown in FIGS. 3 and 5, three first external wiring terminals 1511 and three second external wiring terminals 1512 are provided in the junction box, and one first external wiring terminal 1511 and one corresponding second external wiring terminal 1512 constitute a wiring unit 151. The three wiring units 151 are correspondingly electrically connected to at least one external direct current power supply, and the direct current power supply is any one of a chopper, a battery, and a commutating power supply. In this embodiment, the three wiring units 151 are electrically connected to three chopper power supplies (not shown) in one-to-one correspondence, and all the three choppers have a switching frequency of 1 kHz.

One end of the insulated conductor strip of the field winding unit 1221 is electrically connected to one of the S-pole corresponding brush 131 and the N-pole corresponding brush 132 in one pair of brushes 13, all the one ends of the field winding units 1221 are electrically connected to all the S-pole corresponding brushes 131 in the brushes 13; or, all the one ends of the field winding units 1221 are electrically connected to all the N-pole corresponding brushes 132 in the brushes 13, the three the other ends of the field winding units 1221 serve as three first external wiring terminals 1511 for electrical connection to one electrode of the external direct current power supply (for example, the positive electrode of the direct current power supply), and the three brushes 131, which are not connected with the one ends of the field winding units 1221, are individually provided with wiring terminals serving as three second external wiring terminals 1512 for electrical connection to the other electrode of the direct current power supply (for example, the negative electrode of the direct current power supply). As shown in FIG. 5, in this embodiment, the three one ends of the three field winding units 1221 are correspondingly electrically connected to the three N-pole corresponding brushes 132 in the six brushes, respectively, the three the other ends of the field winding units 1221 serve as three first external wiring terminals 1511 for electrical connection to the external direct current power supply, and the three S-pole corresponding brushes 131, which are not connected with the one ends of the field winding units 1221, are individually provided with wiring terminals serving as three second external wiring terminals 1512 for electrical connection to the external.

Figure 7:
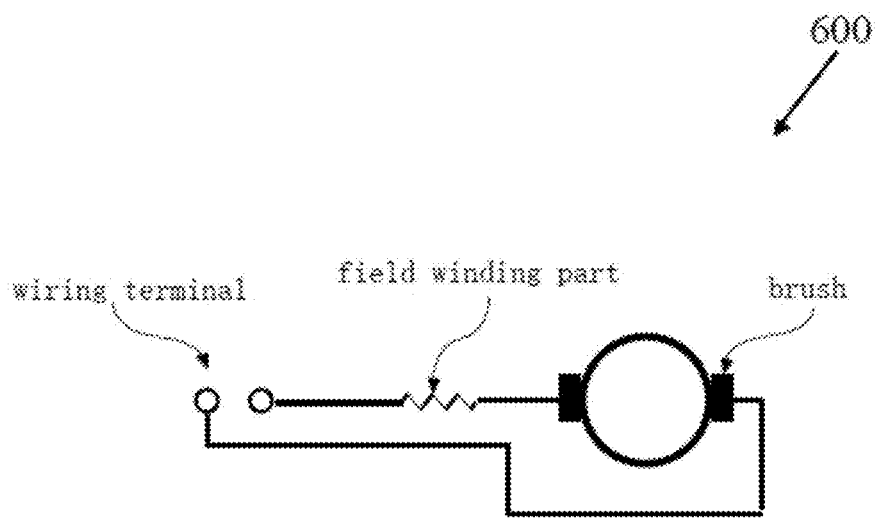
FIG. 7 is a schematic diagram showing circuit connection of a conventional series wound direct current motor.
Figure 8:
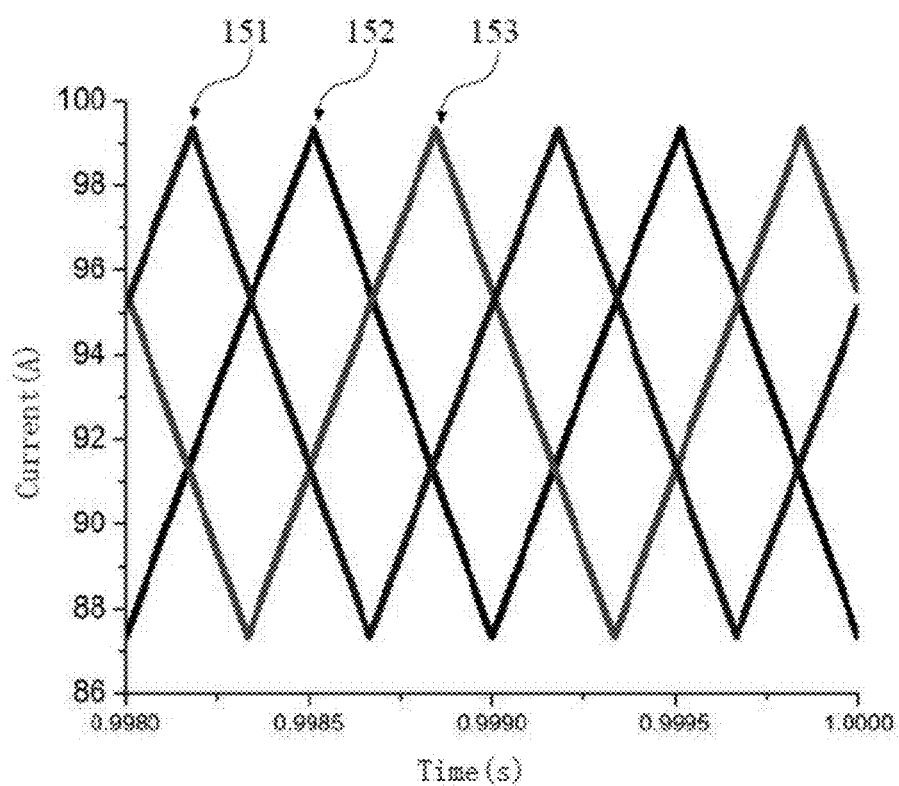
FIG. 8 is a graph showing input current waveforms of three wiring units of a series wound direct current motor of an embodiment of the present invention.
Figure 9:
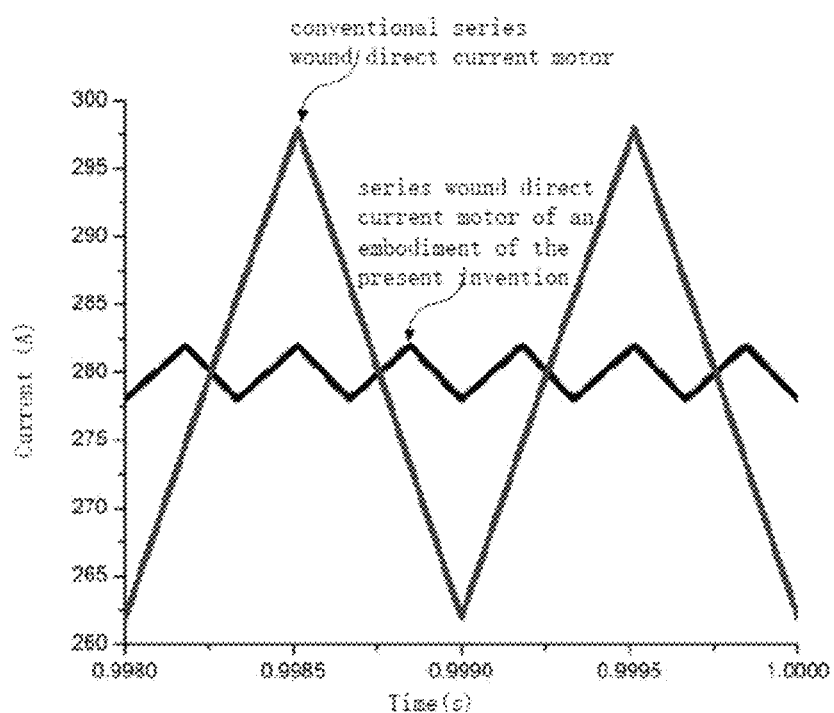
FIG. 9 is a graph comparing the current of a series wound direct current motor of an embodiment of the present invention with that of a conventional series wound direct current motor.
Figure 10:
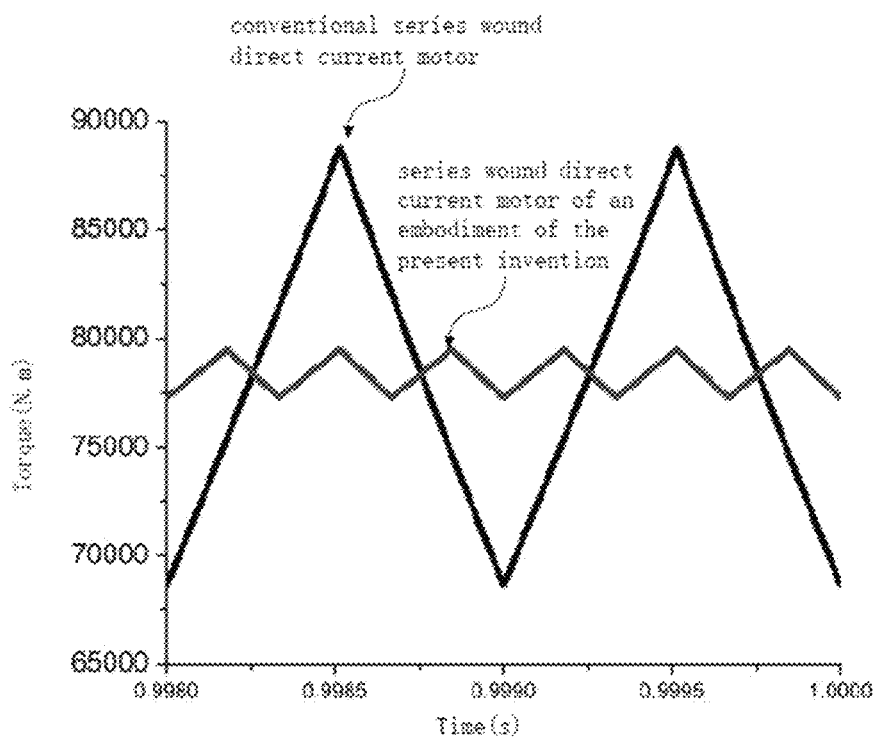
FIG. 10 is a graph comparing the torque of a series wound direct current motor of an embodiment of the present invention with that of a conventional series wound direct current motor.

FIG. 7 is a schematic diagram showing circuit connection of a conventional series wound direct current motor; FIG. 8 is a graph showing input current waveforms of three wiring units of a series wound direct current motor of an embodiment of the present invention; FIG. 9 is a graph comparing the current of a series wound direct current motor of an embodiment of the present invention with that of a conventional series wound direct current motor; and FIG. 10 is a graph comparing the torque of a series wound direct current motor in an embodiment of the present invention with that of a conventional series wound direct current motor.

As shown in FIG. 7, a conventional series wound direct current motor 600 only has one wiring unit, and the wiring unit is correspondingly electrically connected to a chopper power supply (not shown) having a switching frequency of 1 kHz.

In the steady state, the ripple of the current is the difference between the maximum and minimum values, and the ripple coefficient is the ratio, in terms of percentage, of the difference between the maximum and minimum values to the mean value.

As shown in FIG. 8, for the three wiring units 151, 152 and 153 of the series wound direct current motor of this embodiment, the ripples of the input currents are all equal to 99.32−87.36=11.96 amperes, the mean values are all equal to 93.33 amperes, and the ripple coefficients are all equal to 11.96/93.33*100%=12.8%.

As shown in FIG. 9, in the steady state, for the series wound direct current motor of this embodiment, the ripple of the current is equal to 281.96−278.00=3.96 amperes, the mean value is equal to 279.98 amperes, and the ripple coefficient is equal to 3.96/279.98*100%=1.41%. For the conventional series wound direct current motor, the ripple of the current is equal to 297.95−261.99=35.96 amperes, the mean value is equal to 279.98 amperes, and the ripple coefficient is equal to 3.96/279.98*100%=12.8%. Although the mean value of the current of the series wound direct current motor of this embodiment is as same as that of the conventional series wound direct current motor, the ripple and the ripple coefficient of the current of the series wound direct current motor of this embodiment are only 1/9 of those of the conventional series wound direct current motor.

Given that the electromagnetic torque and motion equations of the series wound direct current motor are as follows $$\begin{cases} T_{em} = C_T \Phi I_a = L_{af} I_f I_a & (1) \\ T_{em} - T_{load} = J \dfrac{d}{dt} \Omega & (2) \end{cases}$$

where $T_{em}$ is the electromagnetic torque; $C_T$ is the torque constant; $\Phi$ is the magnetic flux of the main magnetic field; $L_{af}$ is the mutual inductance of the field winding part and the armature windings, and is a constant; $I_f$ is the field current; $I_a$ is the armature current; $T_{load}$ is the load torque; J is the load moment of inertia, and is a constant; and $\Omega$ is the output angular velocity.

In this embodiment, the input current of the series wound direct current motor is equal to the armature current and also equal to the field current, and the rated input current of the series wound direct current motor is the maximum input current of the motor in the rated operation state.

In the equation (1), the electromagnetic torque $T_{em}$ is directly proportional to the product of the armature current $I_a$ and the magnetic flux $\Phi$ of the main magnetic field, and the main magnetic field of the direct current motor is excited by the field winding part powered by a chopper. It can be seen from the equation (1) that the electromagnetic torque $T_{em}$ is directly proportional to the product of the armature current $I_a$ and the field current $I_f$, and the ripple coefficient of the field current $I_f$ and the ripple coefficient of the armature current $I_a$ will lead to an increased ripple coefficient of the electromagnetic torque $T_{em}$, and increased pulse or ripple of the output angular velocity $\Omega$, resulting in degradation of performance of the driving device and electric equipment.

In this embodiment, $L_{af}$ takes value of 1, and in the steady state, as shown in FIG. 10, for the series wound direct current of this embodiment, the ripple of the torque of the motor is equal to 79503.7−77281.1=2222.6 N·m, the mean value is equal to 78390.9 N·m, and the ripple coefficient is equal to 2.84%. For the conventional series wound direct current motor, the ripple of the torque is equal to 88776.6−68639.9=20136.7 N·m, the mean value is equal to 78497.4 N·m, and the ripple coefficient is equal to 25.65%.

That is to say, although the mean value of the torque of the series wound direct current motor of this embodiment is as same as that of the conventional series wound direct current motor, the ripple and the ripple coefficient of the torque of the series wound direct current motor of this embodiment are only 1/9 of those of the conventional series wound direct current motor, so that the ripple and the ripple coefficient of the output torque of the motor are reduced, and in turn the ripple and the ripple coefficient of the output speed of the motor are reduced, thereby achieving the purposes of reducing electromagnetic interference, vibration and noises of the motor and improving the performance of the series wound direct current motor and electric equipment.

Embodiment 2

Figure 11:
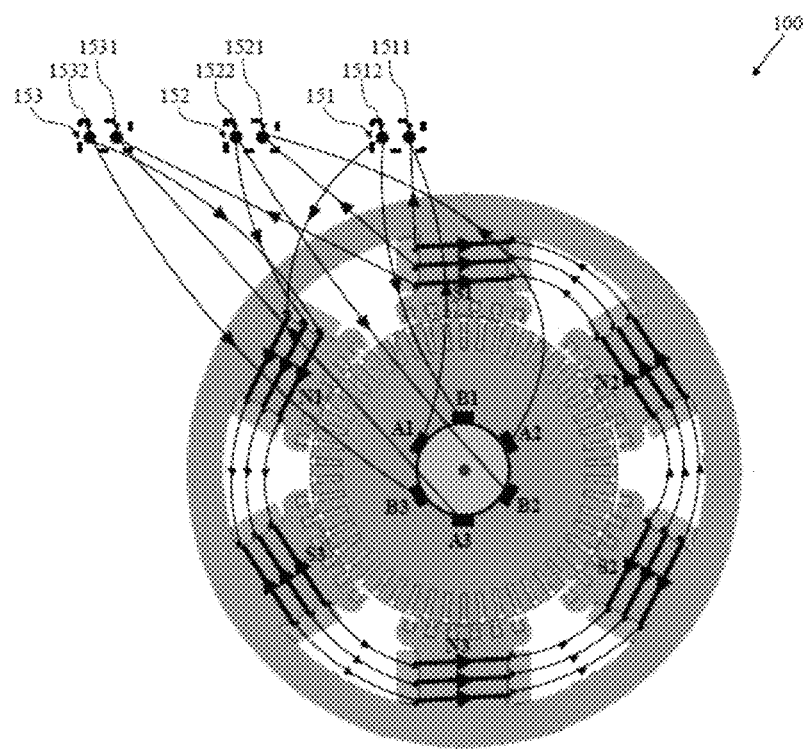
FIG. 11 is a schematic diagram showing the transversal section structure of a shunt wound direct current motor of an embodiment of the present invention.
Figure 12:
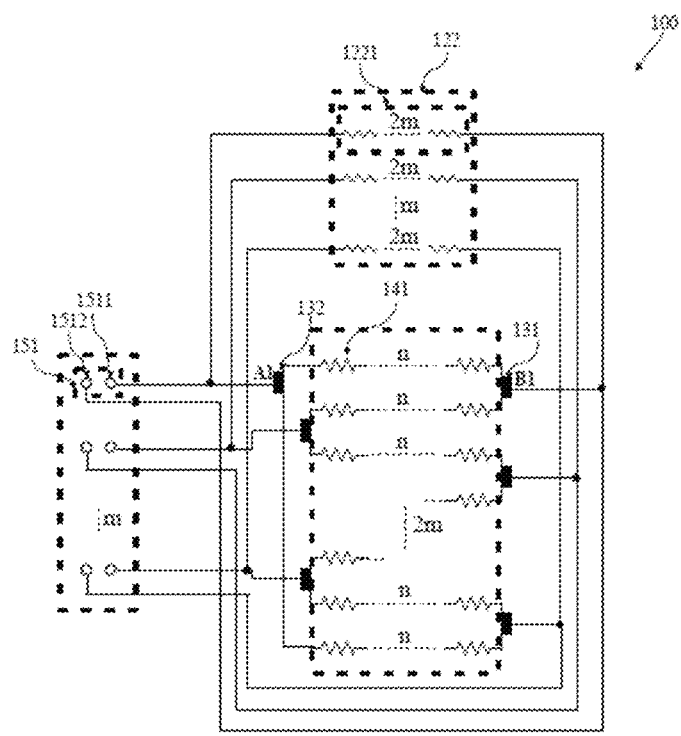
FIG. 12 is a schematic diagram showing circuit connection of armature windings and field windings of a shunt wound direct current motor of the present invention.
Figures 13, 14:
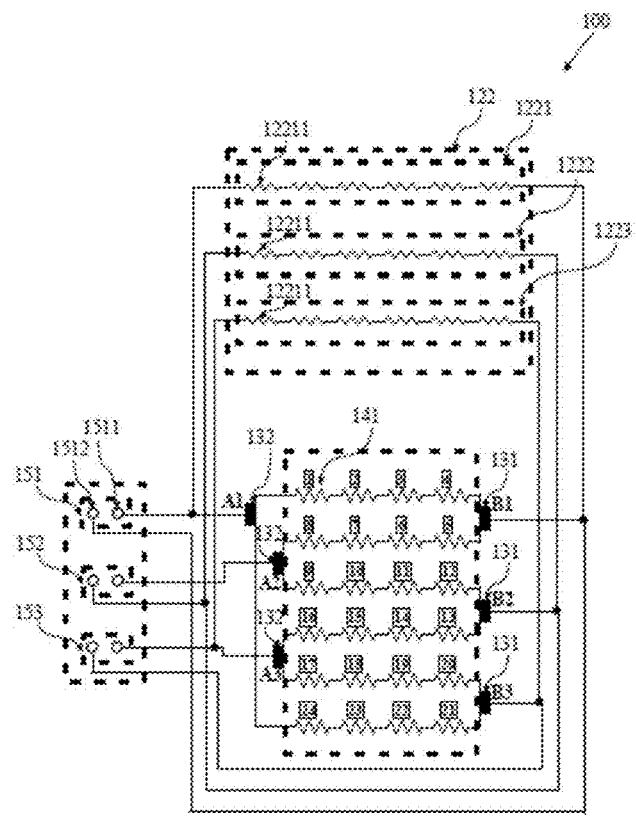
FIG. 13 is a diagram showing circuit connection of armature windings and field windings of a shunt wound direct current motor of an embodiment of the present invention.
FIG. 14 is a schematic diagram showing circuit connection of a conventional shunt wound direct current motor.

FIG. 11 is a schematic diagram showing the transversal section structure of a shunt wound direct current motor of an embodiment of the present invention; FIG. 12 is a schematic diagram showing circuit connection of armature windings and field windings of a shunt wound direct current motor of the present invention; and FIG. 13 is a diagram showing circuit connection of armature windings and field windings of a shunt wound direct current motor of an embodiment of the present invention.

In this embodiment, a direct current motor 100 is a shunt wound direct current motor, and the shunt wound direct current motor is connected to an external direct current power supply (not shown), and has a rated input current corresponding to the external direct current power supply.

As shown in FIGS. 1, 2 and 11, the direct current motor 100 includes a casing 11, a stator 12, brushes 13, a rotor 14, and a junction box (not shown). As shown in FIG. 12, m pairs of brushes are provided according to the value of the rated input current. As shown in FIGS. 13 and 6, m is set to be 3 in this embodiment. If the contact of the transistor power switch can withstand a maximum output current of $I_1$, and the rated input current of the direct current motor is $I_{max}$, then the count of pairs of the brushes, i.e. m, satisfies the following condition: $m > I_{max}/I_1$.

The stator 12 is provided within the casing 11, and includes three pairs (i.e. six in total) of main poles 121, and a field winding part 122; three field coils 12211 are provided on each main pole 121, and each field coil 12211 is formed by winding an insulated conductor, which is made of a conductor coated with an insulating layer, around the main pole 121. The insulated conductor strip is any one of an enameled wire, and an insulated copper conductor strip, and in this embodiment, the insulated conductor strip is an enameled wire. In this embodiment, the three field coils 12211 on each main pole 121 have the same winding direction and number of turns.

As shown in FIGS. 2 and 11, six field coils 12211, each of which is one of the field coils 12211 on each main pole 121, are connected to form a field winding unit 1221 shown in FIG. 12. The field winding part 122 includes three field winding units 1221. The insulated conductor strip of each field winding unit 1221 has one end and the other end, which are distinguished according to a preset current direction of the field coils 12211. Each pair of main poles includes an S-polarity main pole 1211 and an N-polarity main pole 1212 corresponding to the winding direction of the field coils 12211 and the preset current direction of the field coils 12211. In this embodiment, the three field coils 12211 on each main pole 121 have the same winding direction and number of turns.

The connection of the six field coils 12211 of each field winding unit 1221 is any one of series connection, parallel connection, and series-parallel connection, and the connections of the six field coils 12211 of all the field winding units 1221 are identical. In this embodiment, the connection of the six field coils 12211 is a series connection.

As shown in FIGS. 1 and 2, three pairs (i.e. six in total) of brushes 13 are provided within the casing 11, and each pair of brushes 13 includes an S-pole corresponding brush 131 corresponding to the S-polarity main pole 1211, and an N-pole corresponding brush 132 corresponding to the N-polarity main pole 1212.

The brushes 13 are any one of narrow brushes, and wide brushes, and in this embodiment, the brushes 13 are narrow brushes.

As shown in FIG. 2, the rotor 14 is provided within the stator, and as shown in FIG. 6, includes a plurality of armature windings 141 which in a predetermined connection, and the predetermined connection is any one of simplex lap connection, multiplex lap connection, and multiplex wave connection. In this embodiment, the plurality of armature windings are in a simplex lap connection.

The junction box (not shown) is fixed to the casing 11, and as shown in FIGS. 2 and 13, three first external wiring terminals 1511 and three second external wiring terminals 1512 are provided in the junction box, and one first external wiring terminal 1511 and one corresponding second external wiring terminal 1512 constitute a wiring unit 151 (152 or 153). The three wiring units 151, 152 and 153 are correspondingly electrically connected to at least one external direct current power supply, and the direct current power supply is any one of a chopper, a battery and a commutating power supply. In this embodiment, the three wiring units 151 are electrically connected to three chopper power supplies (not shown) in one-to-one correspondence, and all the three choppers have a switching frequency of 1 kHz.

All the one ends of the field winding units 1221 are electrically connected to all the S-pole corresponding brushes 131 in the brushes 13 to form first external wiring terminals, while all the other ends of the field winding units 1221 are electrically connected to all the N-pole corresponding brushes 132 in the brushes 13 to form second external wiring terminals; or, all the one ends of the field winding units 1221 are electrically connected to all the N-pole corresponding brushes 132 in the brushes 13 to form first external wiring terminals, while all the other ends of the field winding units 1221 are electrically connected to all the S-pole corresponding brushes 131 in the brushes 13 to form second external wiring terminals. The three first external wiring terminals and the three second external wiring terminals are for electrical connection to the external.

As shown in FIG. 13, in this embodiment, the three one ends of the three field winding units 1221 are correspondingly electrically connected to the three N-pole corresponding brushes 132 in the six brushes, respectively, to form three first external wiring terminals 1511 for electrical connection to one electrode (in this embodiment, the positive electrode) of the external direct current power supply, and the three the other ends of the three field winding units 1221 are correspondingly electrically connected to the three S-pole corresponding brushes 131 in the six brushes, respectively, to form three second external wiring terminals 1512 for electrical connection to one electrode (in this embodiment, the negative electrode) of the external direct current power supply.

Figure 15:
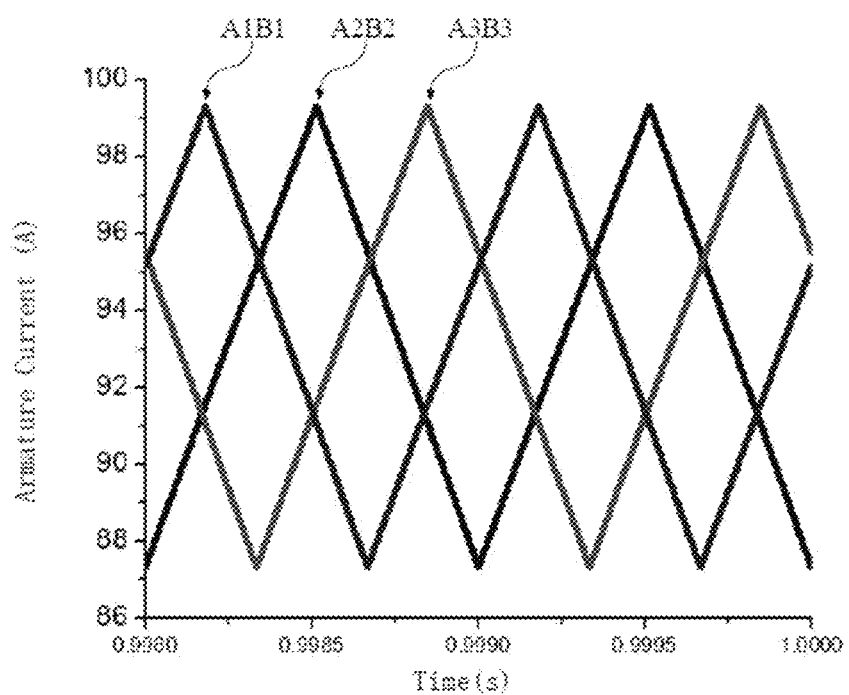
FIG. 15 is a graph showing input current waveforms of three pairs of brushes of a shunt wound direct current motor of an embodiment of the present invention.
Figure 16:
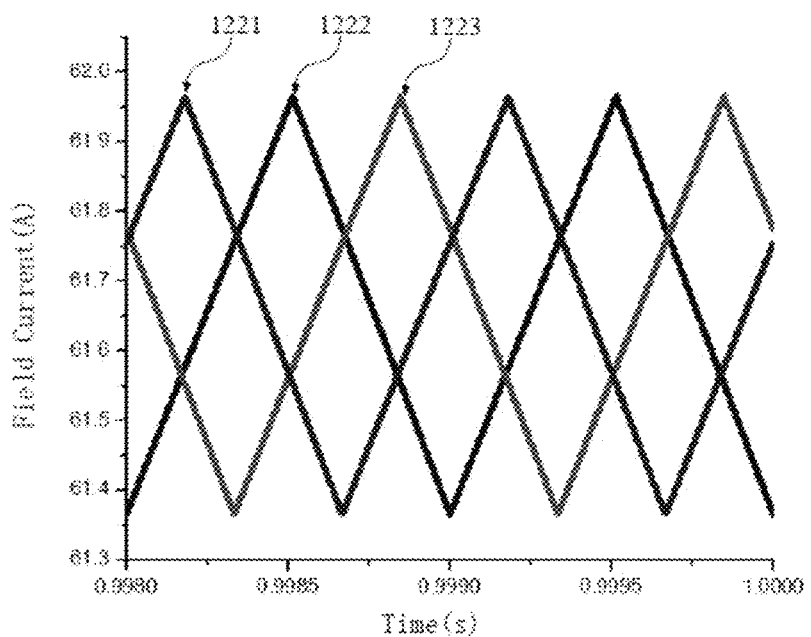
FIG. 16 is a graph showing input current waveforms of three field windings of a shunt wound direct current motor of an embodiment of the present invention.
Figure 17:
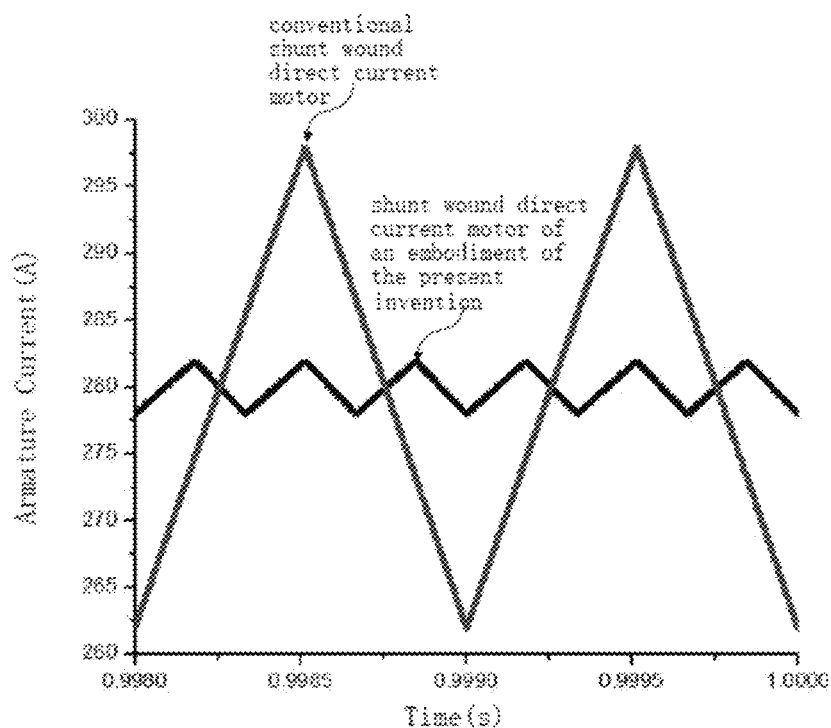
FIG. 17 is a graph comparing the armature current of a shunt wound direct current motor of an embodiment of the present invention with that of a conventional shunt wound direct current motor.
Figure 18:
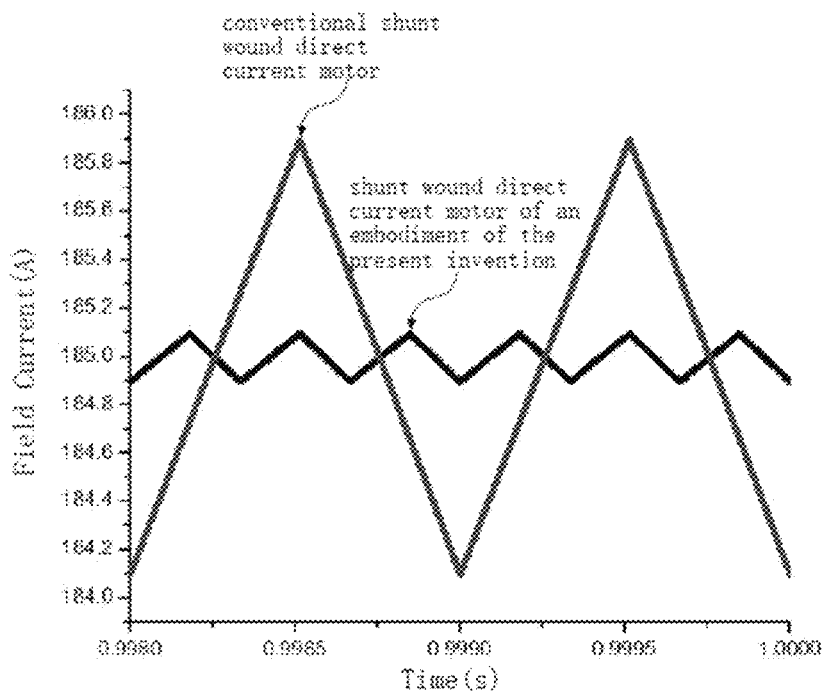
FIG. 18 is a graph comparing the field current of a shunt wound direct current motor of an embodiment of the present invention with that of a conventional shunt wound direct current motor.
Figure 19:
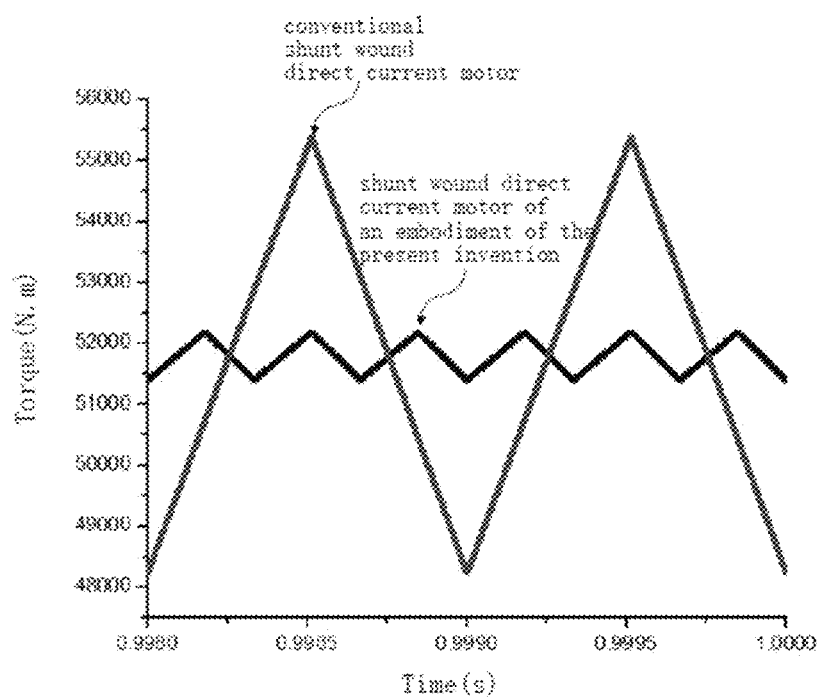
FIG. 19 is a graph comparing the torque of a shunt wound direct current motor of an embodiment of the present invention with that of a conventional shunt wound direct current motor.

FIG. 14 is a schematic diagram showing circuit connection of a conventional shunt wound direct current motor; FIG. 15 is a graph showing input current waveforms of three wiring units of a shunt wound direct current motor of an embodiment of the present invention; FIG. 16 is a graph showing input current waveforms of three field windings of a shunt wound direct current motor of an embodiment of the present invention; FIG. 17 is a graph comparing the armature current of a shunt wound direct current motor of an embodiment of the present invention with that of a conventional shunt wound direct current motor; FIG. 18 is a graph comparing the field current of a shunt wound direct current motor of an embodiment of the present invention with that of a conventional shunt wound direct current motor; and FIG. 19 is a graph comparing the torque of a shunt wound direct current motor of an embodiment of the present invention with that of a conventional shunt wound direct current motor.

As shown in FIG. 14, a conventional shunt wound direct current motor 600 only has one wiring unit, and the wiring unit is correspondingly electrically connected to a chopper power supply (not shown) having a switching frequency of 1 kHz.

In the steady state, the ripple of the current is the difference between the maximum and minimum values, and the ripple coefficient is the ratio, in terms of percentage, of the difference between the maximum and minimum values to the mean value.

As shown in FIG. 15, for the three pairs of brushes A1B1, A2B2 and A3B3 of the shunt wound direct current motor of this embodiment, the ripples of the input currents are all equal to 99.31−87.33=11.99 amperes, the mean values are all equal to 93.32 amperes, and the ripple coefficients are all equal to 11.99/93.32*100%=12.84%.

As shown in FIG. 16, for the three field winding units 1221, 1222 and 1223 of the shunt wound direct current motor of this embodiment, the ripples of the input currents are all equal to 61.97−61.37=0.60 amperes, the mean values are all equal to 61.67 amperes, and the ripple coefficients are all equal to 0.60/61.67*100%=0.97%.

As shown in FIG. 17, in the steady state, for the shunt wound direct current motor of this embodiment whose armature current equals to the sum of the currents of the three pairs of brushes A1B1, A2B2 and A3B3, the ripple of the armature current is equal to 281.95−277.98=3.97 amperes, the mean value is equal to 279.97 amperes, and the ripple coefficient is equal to 3.97/279.97*100%=1.42%. For the conventional shunt wound direct current motor, the ripple of the armature current is equal to 297.94−261.98=35.96 amperes, the mean value is equal to 279.97 amperes, and the ripple coefficient is equal to 35.96/279.97*100%=12.84%. Although the mean value of the armature current of the shunt wound direct current motor of this embodiment is as same as that of the conventional shunt wound direct current motor, the ripple and the ripple coefficient of the armature current of the shunt wound direct current motor of this embodiment are only ⅑ of those of the conventional shunt wound direct current motor.

As shown in FIG. 18, in the steady state, for the shunt wound direct current motor of this embodiment whose field current equals to the sum of the currents of the three field winding units 1221, 1222 and 1223, the ripple of the field current is equal to 185.10−184.90=0.2 amperes, the mean value is equal to 185.0 amperes, and the ripple coefficient is equal to 0.2/185*100%=0.11%. For the conventional shunt wound direct current motor, the ripple of the armature current is equal to 185.9−184.1=1.8 amperes, the mean value is equal to 185.0 amperes, and the ripple coefficient is equal to 1.8/185.0*100%=0.97%. Although the mean value of the field current of the shunt wound direct current motor of this embodiment is as same as that of the conventional shunt wound direct current motor, the ripple and the ripple coefficient of the field current of the shunt wound direct current motor of this embodiment are only ⅑ of those of the conventional shunt wound direct current motor.

Given that the electromagnetic torque and motion equations of the shunt wound direct current motor are as follows $$\begin{cases} T_{em} = C_T \Phi I_a = L_{af} I_f I_a & (1) \\ T_{em} - T_{load} = J \dfrac{d}{dt}\Omega & (2) \end{cases}$$

where $T_{em}$ is the electromagnetic torque; $C_T$ is the torque constant; $\Phi$ is the magnetic flux of the main magnetic field; $L_{af}$ is the mutual inductance of the field winding part and the armature windings, and is a constant; $I_f$ is the field current; $I_a$ is the armature current; $T_{load}$ is the load torque; J is the load moment of inertia, and is a constant; and $\Omega$ is the output angular velocity.

In this embodiment, the input current of the shunt wound direct current motor is equal to the sum of the armature current and the field current, and the rated input current of the shunt wound direct current motor is the maximum input current of the motor in the rated operation state.

In the equation (1), the electromagnetic torque $T_{em}$ is directly proportional to the product of the armature current $I_a$ and the magnetic flux $\Phi$ of the main magnetic field, and the main magnetic field of the direct current motor is excited by the field winding part powered by a chopper. It can be seen from the equation (1) that the electromagnetic torque $T_{em}$ is directly proportional to the product of the armature current $I_a$ and the field current $I_f$, and the ripple coefficient of the field current $I_f$ and the ripple coefficient of the armature current $I_a$ will lead to an increased ripple coefficient of the electromagnetic torque $T_{em}$, and increased pulse or ripple of the output angular velocity $\Omega$, resulting in degradation of performance of the driving device and electric equipment.

In this embodiment, $L_{af}$ takes value of 1, and in the steady state, as shown in FIG. 19, for the shunt wound direct current of this embodiment, the ripple of the torque of the motor is equal to 52188.25−51398.38=789.87 N·m, the mean value is equal to 51793.56 N·m, and the ripple coefficient is equal to 1.53%. For the conventional shunt wound direct current motor, the ripple of the torque is equal to 55386.15−48229.93=7156.21 N·m, the mean value is equal to 51798.89 N·m, and the ripple coefficient is equal to 13.82%.

That is to say, although the mean value of the torque of the shunt wound direct current motor of this embodiment is as same as that of the conventional shunt wound direct current motor, the ripple and the ripple coefficient of the torque of the shunt wound direct current motor of this embodiment are only ⅑ of those of the conventional motor, so that the ripple and the ripple coefficient of the output torque of the motor are reduced, and in turn the ripple and the ripple coefficient of the output speed of the motor are reduced, thereby achieving the purposes of reducing electromagnetic interference, vibration and noises of the motor and improving the performance of the shunt wound direct current motor and electric equipment.

Embodiment 3

Figure 20:
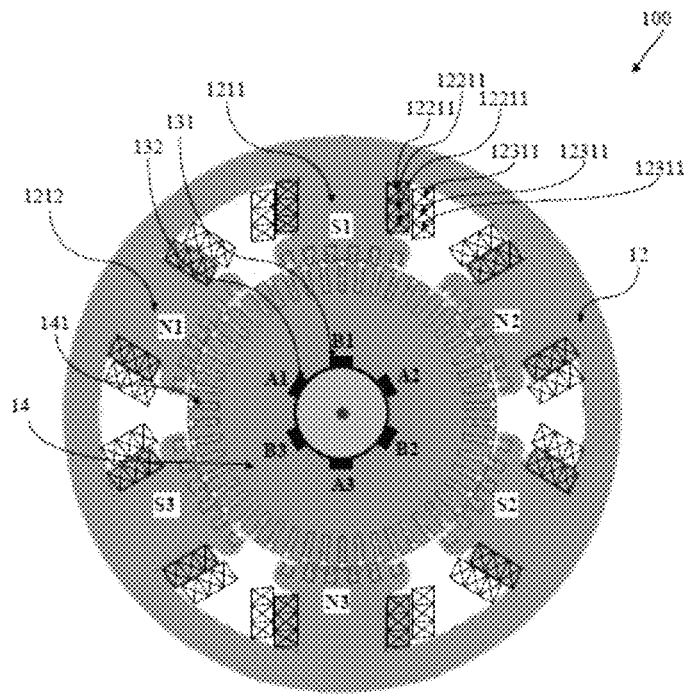
FIG. 20 is a schematic diagram showing the transversal section structure of a series-shunt wound direct current motor of an embodiment of the present invention.
Figure 21:
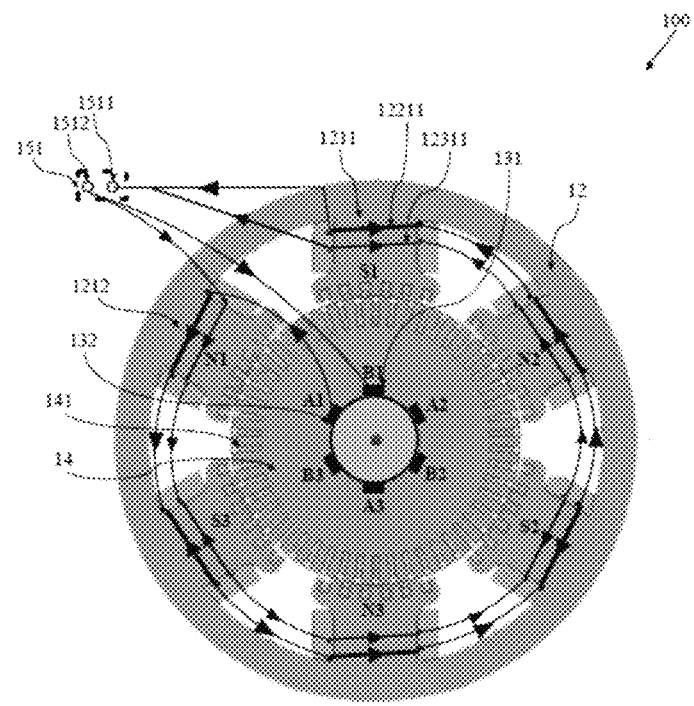
FIG. 21 is a schematic diagram showing circuit connection in the transversal section structure of a series-shunt wound direct current motor of an embodiment of the present invention.
Figure 22:
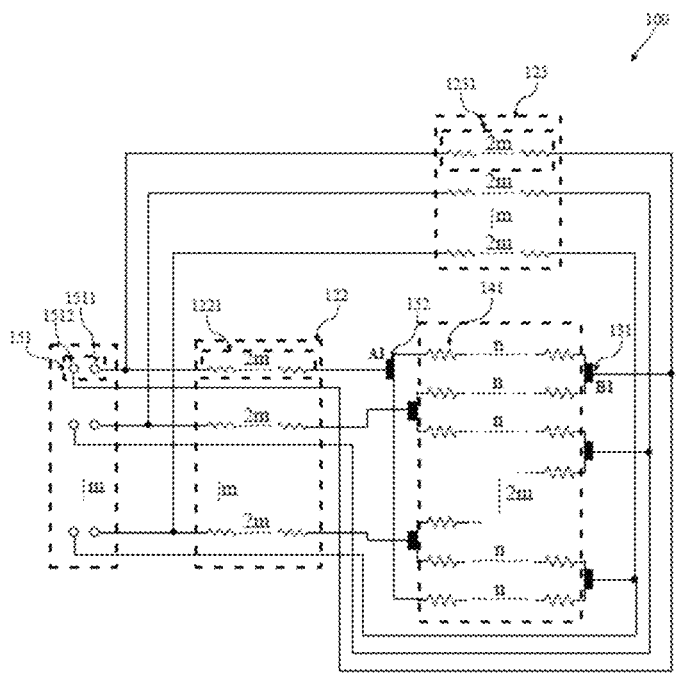
FIG. 22 is a schematic diagram showing circuit connection of armature windings and field windings of a series-shunt wound direct current motor of the present invention.
Figure 23:
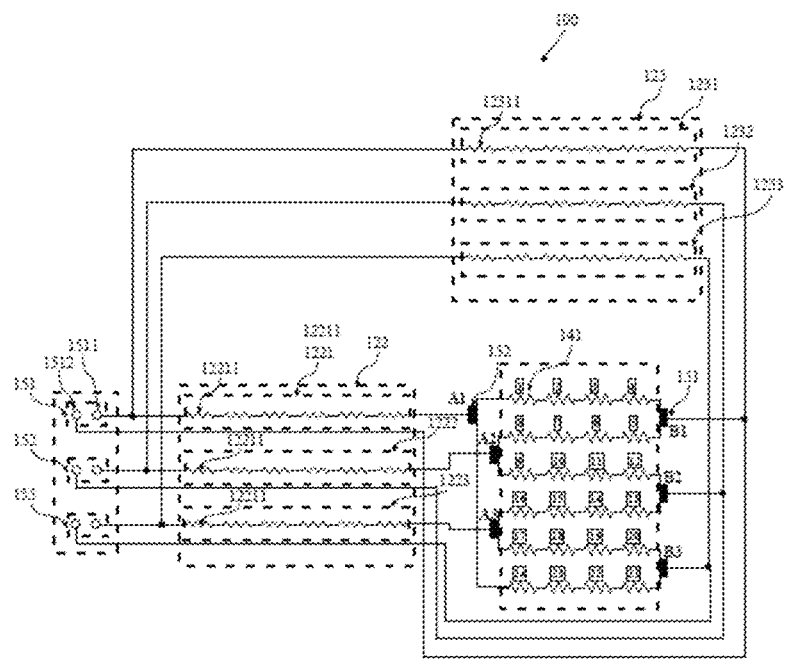
FIG. 23 is a schematic diagram showing circuit connection of armature windings and field windings of a series-shunt wound direct current motor of an embodiment of the present invention.

FIG. 20 is a schematic diagram showing the transversal section structure of a series-shunt wound direct current motor of an embodiment of the present invention; FIG. 21 is a schematic diagram showing circuit connection in the transversal section structure of a series-shunt wound direct current motor of an embodiment of the present invention; FIG. 22 is a schematic diagram showing circuit connection of armature windings and field windings of a series-shunt wound direct current motor of the present invention; and FIG. 23 is a schematic diagram showing circuit connection of armature windings and field windings of a series-shunt wound direct current motor of an embodiment of the present invention.

In this embodiment, a direct current motor 100 is a series-shunt wound direct current motor, and the series-shunt wound direct current motor 100 is connected to an external direct current power supply (not shown), and has a rated input current corresponding to the external direct current power supply.

As shown in FIGS. 1, 2, 20 and 21, the direct current motor 100 includes a casing 11, a stator 12, brushes 13, a rotor 14, and a junction box (not shown). As shown in FIG. 22, m pairs of brushes are provided according to the value of the rated input current. As shown in FIGS. 23 and 6, m is set to be 3 in this embodiment. If the contact of the transistor power switch can withstand a maximum output current of $I_1$, and the rated input current of the direct current motor is $I_{max}$, then the count of pairs of the brushes, i.e. m, satisfies the following condition: $m > I_{max}/I_1$.

The stator 12 is provided within the casing 11, and includes three pairs (i.e. six in total) of main poles 121, a series field winding part 122, and a shunt field winding part 123; three series field coils 12211 and three shunt field coils 12311 are provided on each main pole 121, and each series field coil 12211 and each shunt field coil 12311 are both formed by winding an insulated conductor strip, which is made of a conductor strip coated with an insulating layer, around the main pole 121. The insulated conductor strip is any one of an enameled wire, and an insulated copper conductor strip, and in this embodiment, the insulated conductor strip is an enameled wire. In this embodiment, the three field coils on each main pole 121 have the same winding direction and number of turns.

As shown in FIGS. 2, 20 and 21, six series field coils 12211, each of which is one of the series field coils 12211 on each main pole 121, are connected to form a series field winding unit 1221 shown in FIG. 23. The field winding part 122 includes three series field winding units 1221. The insulated conductor strip of each series field winding unit 1221 has one series end and the other series end, which are distinguished according to a preset current direction of the series field coils 12211.

Six shunt field coils 12311, each of which is one of the shunt field coils 12311 on each main pole 121, are connected to form a shunt field winding unit 1231 shown in FIG. 23. The shunt field winding part 123 includes three shunt field winding units 1231. The insulated conductor strip of each shunt field winding unit 1231 has one shunt end and the other shunt end, which are distinguished according to a preset current direction of the shunt field coils.

Each pair of main poles includes an S-polarity main pole 1211 and an N-polarity main pole 1212 corresponding to the winding direction of the series field coils 12211 and the preset current direction of the field coils. The three series field coils 12211 on each main pole have the same winding direction and number of turns, while the three shunt field coils 12311 have the same winding direction and number of turns.

The connection of the six series field coils 12211 of each series field winding unit 1221 is any one of series connection, parallel connection, and series-parallel connection, and the connections of the six series field coils 12211 of all the series field winding units 1221 are identical. In this embodiment, the connection of the six series field coils 12211 is a series connection.

The connection of the six shunt field coils 12311 of each shunt field winding unit 1231 is any one of series connection, parallel connection, and series-parallel connection, and the connections of the six shunt field coils 12311 of all the shunt field winding units 1231 are identical. In this embodiment, the connection of the six shunt field coils 12311 is a series connection.

As shown in FIGS. 1, 2, 20 and 21, three pairs (i.e. six in total) of brushes 13 are provided within the casing 11, and each pair of brushes 13 includes an S-pole corresponding brush 131 corresponding to the S-polarity main pole 1211, and an N-pole corresponding brush 132 corresponding to the N-polarity main pole 1212.

The brushes 13 are any one of narrow brushes, and wide brushes, and in this embodiment, the brushes 13 are narrow brushes.

As shown in FIGS. 1, 2, 20 and 23, the rotor 14 is provided within the stator 12, and as shown in FIG. 6, includes a plurality of armature windings 141 in a predetermined connection, and the predetermined connection is any one of simplex lap connection, multiplex lap connection, and multiplex wave connection. In this embodiment, the plurality of armature windings are in a simplex lap connection.

The junction box (not shown) is fixed to the casing 11, and as shown in FIGS. 2, 20, 21 and 23, three first external wiring terminals 1511 and three second external wiring terminals 1512 are provided in the junction box, and one first external wiring terminal 1511 and one corresponding second external wiring terminal 1512 constitute a wiring unit 151. The three wiring units 151 are correspondingly electrically connected to the other electrode of at least one external direct current power supply (for example, the negative electrode of the direct current power supply), and the direct current power supply is any one of a chopper, a battery and a commutating power supply. In this embodiment, the three wiring units 151 are electrically connected to three chopper power supplies (not shown) in one-to-one correspondence, and all the three choppers have a switching frequency of 1 kHz.

All the one series ends of the insulated conductor strips of the series field winding units are electrically connected to all the S-pole corresponding brushes in the brushes; or, all the one series ends of the insulated conductor strips of the series field winding units are electrically connected to all the N-pole corresponding brushes in the brushes. In this embodiment, all the one series ends of the insulated conductor strips of the field winding units 1221 are electrically connected to all the S-pole corresponding brushes 131 in the brushes 13. The three one series ends of the series field winding units serve as three first external wiring terminals for electrical connection to one electrode of the external direct current power supply (for example, the positive electrode of the direct current power supply). The three brushes, which are not connected with the one series ends of the series field winding units, are individually provided with wiring terminals serving as three second external wiring terminals for electrical connection to the direct current power supply.

The three one shunt ends of the shunt field winding units are electrically connected to the three first external wiring terminals, while the three the other shunt ends are electrically connected to the three second external wiring terminals; or, the three one shunt ends of the shunt field winding units are electrically connected to the three second external wiring terminals, while the three the other shunt ends are electrically connected to the three first external wiring terminals. In this embodiment, all the one shunt ends of the insulated conductor strips of the shunt field winding units 1231 are electrically connected to all the first external wiring terminals. The three the other shunt ends of the shunt field winding units serve as three second external wiring terminals for electrical connection to the other electrode of the external direct current power supply (for example, the negative electrode of the direct current power supply).

The three first external wiring terminals and the three second external wiring terminals are for electrical connection to the external direct current power supply.

As shown in FIG. 23, in this embodiment, the three one ends of the three series field winding units 1221 are correspondingly electrically connected to the three N-pole corresponding brushes 132 in the six brushes, respectively, the three the other ends of the series field winding units 1221 serve as three first external wiring terminals 1511 for electrical connection to one electrode of the external direct current power supply (for example, the positive electrode of the direct current power supply), the three one ends of the shunt field winding units 1231 are correspondingly electrically connected to the three first external wiring terminals 1511, respectively, and the three the other ends of the three shunt field winding units 1231 are electrically connected to the three second external wiring terminals 1512, respectively. The excitation of the series field winding units and the corresponding three shunt field winding units may be any one of cumulative compound excitation and differential compound excitation, and in this embodiment, is cumulative compound excitation.

Figure 24:
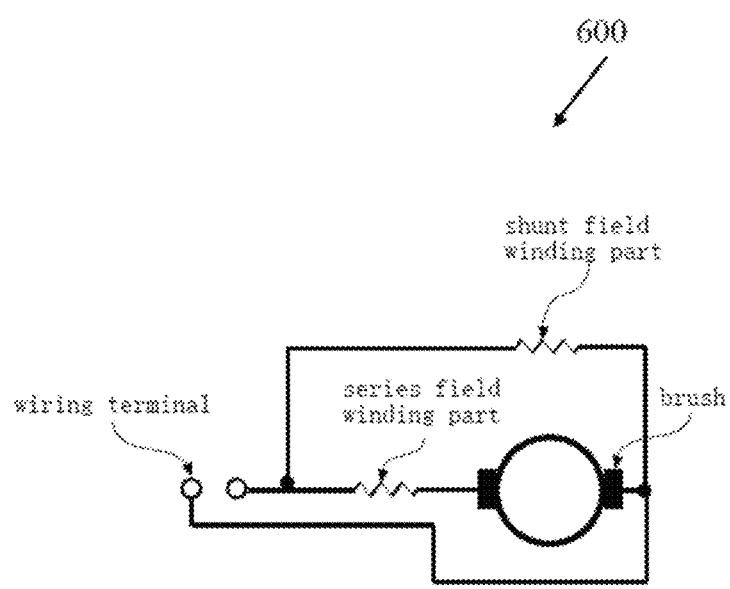
FIG. 24 is a schematic diagram showing circuit connection of a conventional series-shunt wound direct current motor.
Figure 25:
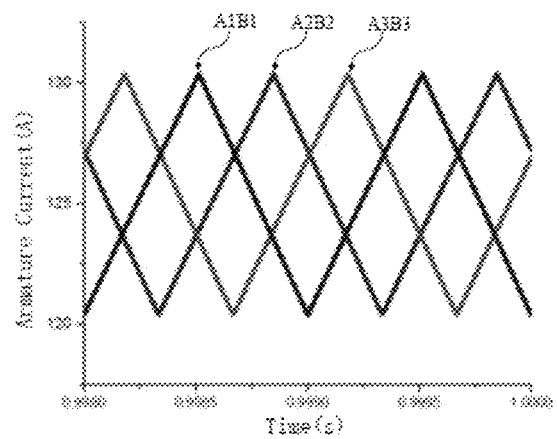
FIG. 25 is a graph showing input current waveforms of three pairs of brushes of a series-shunt wound direct current motor of an embodiment of the present invention.
Figure 26:
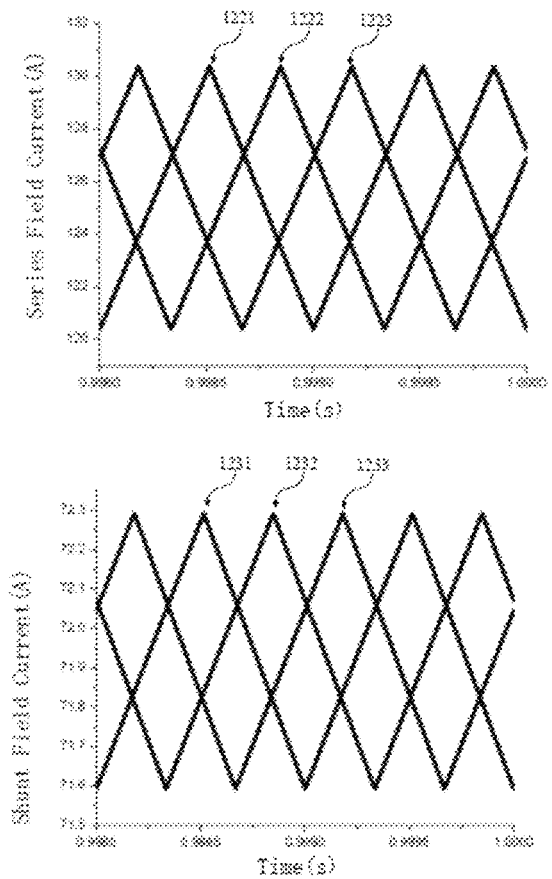
FIG. 26 is a graph showing input current waveforms of three field windings of a series-shunt wound direct current motor of an embodiment of the present invention.
Figure 27:
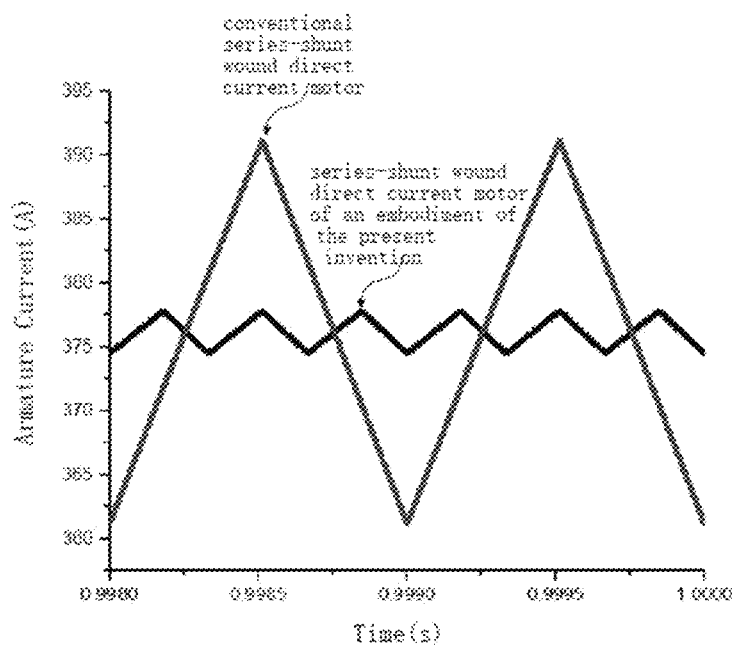
FIG. 27 is a graph comparing the armature current of a series-shunt wound direct current motor of an embodiment of the present invention with that of a conventional series-shunt wound direct current motor.
Figure 28:
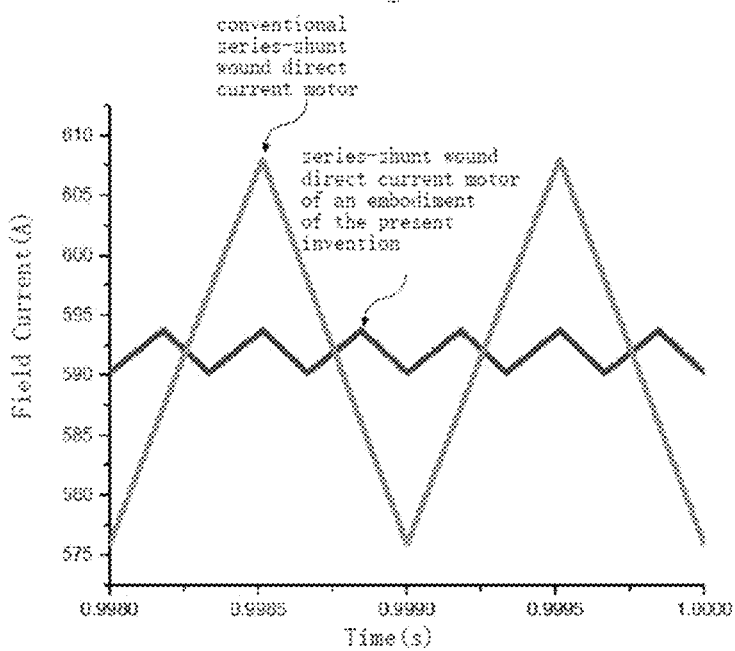
FIG. 28 is a graph comparing the field current of a series-shunt wound direct current motor of an embodiment of the present invention with that of a conventional series-shunt wound direct current motor.
Figure 29:
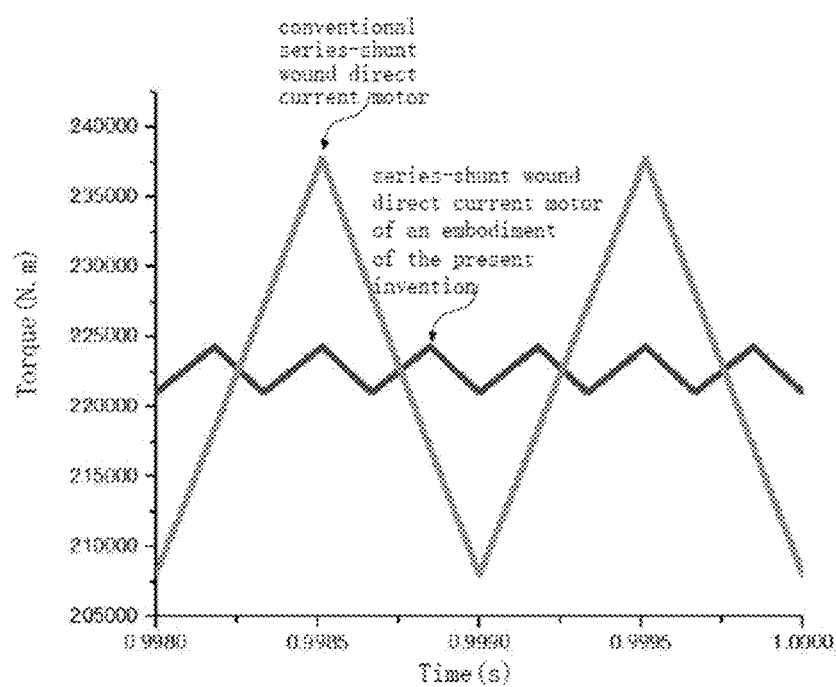
FIG. 29 is a graph comparing the torque of a series-shunt wound direct current motor of an embodiment of the present invention with that of a conventional series-shunt wound direct current motor.

FIG. 24 is a schematic diagram showing circuit connection of a conventional series-shunt wound direct current motor; FIG. 25 is a graph showing input current waveforms of three pairs of brushes of a series-shunt wound direct current motor of an embodiment of the present invention; FIG. 26 is a graph showing input current waveforms of three field windings of a series-shunt wound direct current motor of an embodiment of the present invention; FIG. 27 is a graph comparing the armature current of a series-shunt wound direct current motor of an embodiment of the present invention with that of a conventional series-shunt wound direct current motor; FIG. 28 is a graph comparing the field current of a series-shunt wound direct current motor of an embodiment of the present invention with that of a conventional series-shunt wound direct current motor; and FIG. 29 is a graph comparing the torque of a series-shunt wound direct current motor of an embodiment of the present invention with that of a conventional series-shunt wound direct current motor.

As shown in FIG. 24, a conventional series-shunt wound direct current motor 600 only has one wiring unit, and the wiring unit is correspondingly electrically connected to a chopper power supply (not shown) having a switching frequency of 1 kHz.

In the steady state, the ripple of the current is the difference between the maximum and minimum values, and the ripple coefficient is the ratio, in terms of percentage, of the difference between the maximum and minimum values to the mean value.

As shown in FIG. 25, for the three pairs of brushes A1B1, A2B2 and A3B3 of the series-shunt wound direct current motor of this embodiment, the ripples of the currents are all equal to 130.38−120.40=9.98 amperes, the mean values are all equal to 125.39 amperes, and the ripple coefficients are all equal to 9.98/125.39*100%=7.96%.

As shown in FIG. 26, for the three series field winding units 1221, 1222 and 1223 of the series-shunt wound direct current motor of this embodiment, the ripples of the currents are all equal to 130.38−120.40=9.98 amperes, the mean values are all equal to 125.39 amperes, and the ripple coefficients are all equal to 9.98/125.39*100%=7.96%. For the three shunt field winding units 1231, 1232 and 1233, the ripples of the currents are all equal to 72.29−71.59=0.70 amperes, the mean values are all equal to 71.94 amperes, and the ripple coefficients are all equal to 0.70/71.94*100%=0.97%.

As shown in FIG. 27, in the steady state, for the series-shunt wound direct current motor of this embodiment whose armature current equals to the sum of the currents of the three pairs of brushes A1B1, A2B2 and A3B3, the ripple of the armature current is equal to 377.82−374.51=3.31 amperes, the mean value is equal to 376.16 amperes, and the ripple coefficient is equal to 3.31/376.16*100%=0.88%. For the conventional motor, the ripple of the armature current is equal to 391.14−361.17=29.97 amperes, the mean value is equal to 376.16 amperes, and the ripple coefficient is equal to 29.97/376.16*100%=7.97%. Although the mean value of the armature current of the series-shunt wound direct current motor of this embodiment is as same as that of the conventional series-shunt wound direct current motor, the ripple and the ripple coefficient of the armature current of the series-shunt wound direct current motor of this embodiment are only ⅑ of those of the conventional series-shunt wound direct current motor.

As shown in FIG. 28, in the steady state, for the series-shunt wound direct current motor of this embodiment whose field current equals to the sum of the currents of the three series field winding units 1221, 1222 and 1223 and the three shunt field winding units 1231, 1232 and 1233, the ripple of the field current is equal to 593.76−590.22=3.54 amperes, the mean value is equal to 591.99 amperes, and the ripple coefficient is equal to 3.54/591.99*100%=0.60%. For the conventional series-shunt wound direct current motor, the ripple of the armature current is equal to 608.02−575.95=32.07 amperes, the mean value is equal to 591.99 amperes, and the ripple coefficient is 32.07/591.99*100%=5.42%. Although the mean value of the field current of the series-shunt wound direct current motor of this embodiment is as same as that of the conventional series-shunt wound direct current motor, the ripple and the ripple coefficient of the field current of the series-shunt wound direct current motor of this embodiment are only ⅑ of those of the conventional series-shunt wound direct current motor.

Given that the electromagnetic torque and motion equations of the series-shunt wound direct current motor are as follows $$\begin{cases} T_{em} = C_T \Phi I_a = L_{af} I_f I_a & (1) \\ T_{em} - T_{load} = J \dfrac{d}{dt} \Omega & (2) \end{cases}$$

where $T_{em}$ is the electromagnetic torque; $C_T$ is the torque constant; $\Phi$ is the magnetic flux of the main magnetic field; $L_{af}$ is the mutual inductance of the field winding part and the armature windings, and is a constant; $I_f$ is the field current; $I_a$ is the armature current; $T_{load}$ is the load torque; J is the load moment of inertia, and is a constant; and $\Omega$ is the output angular velocity.

In this embodiment, the input current of the series-shunt wound direct current motor is equal to the sum of the armature current and the shunt field current and also equal to the sum of the series field current and the shunt field current, and the rated input current of the series-shunt wound direct current motor is the maximum input current of the motor in the rated operation state.

In the equation (1), the electromagnetic torque $T_{em}$ is directly proportional to the product of the armature current $I_a$ and the magnetic flux $\Phi$ of the main magnetic field, and the main magnetic field of the direct current motor is excited by the field winding part powered by a chopper. It can be seen from the equation (1) that the electromagnetic torque $T_{em}$ is directly proportional to the product of the armature current $I_a$ and the field current $I_f$, and the ripple coefficient of the field current $I_f$ and the ripple coefficient of the armature current $I_a$ will lead to an increased ripple coefficient of the electromagnetic torque $T_{em}$, and increased pulse or ripple of the output angular velocity Ω, resulting in degradation of performance of the driving device and electric equipment.

In this embodiment, $L_{af}$ takes a value of 1, and in the steady state, as shown in FIG. 29, for the series-shunt wound direct current of this embodiment, the ripple of the torque of the motor is equal to 224331.78−221042.30=3289.48 N·m, the mean value is equal to 222686.66 N·m, and the ripple coefficient is equal to 3289.48/222686.66=1.48%. For the conventional series-shunt wound direct current motor, the ripple of the torque is equal to 237820.34−208017.82=29802.52 N·m, the mean value is equal to 222765.80 N·m, and the ripple coefficient is equal to 29802.52/222765.80=13.38%.

That is to say, although the mean value of the torque of the series-shunt wound direct current motor of this embodiment is as same as that of the conventional series-shunt wound direct current motor, the ripple and the ripple coefficient of the torque of the series-shunt wound direct current motor of this embodiment are only 1/9 of those of the conventional series-shunt wound direct current motor, so that the ripple and the ripple coefficient of the output torque of the motor are reduced, and in turn the ripple and the ripple coefficient of the output speed of the motor are reduced, thereby achieving the purpose of reducing electromagnetic interference, vibration and noises of the motor.

Embodiment 4

Figure 30:
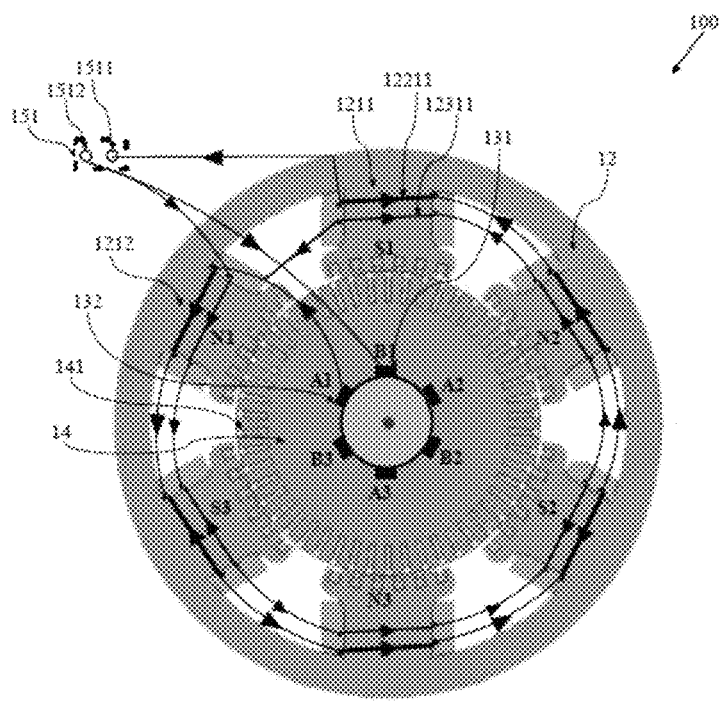
FIG. 30 is a schematic diagram showing circuit connection in the transversal section structure of a shunt-series wound direct current motor of an embodiment of the present invention.
Figure 31:
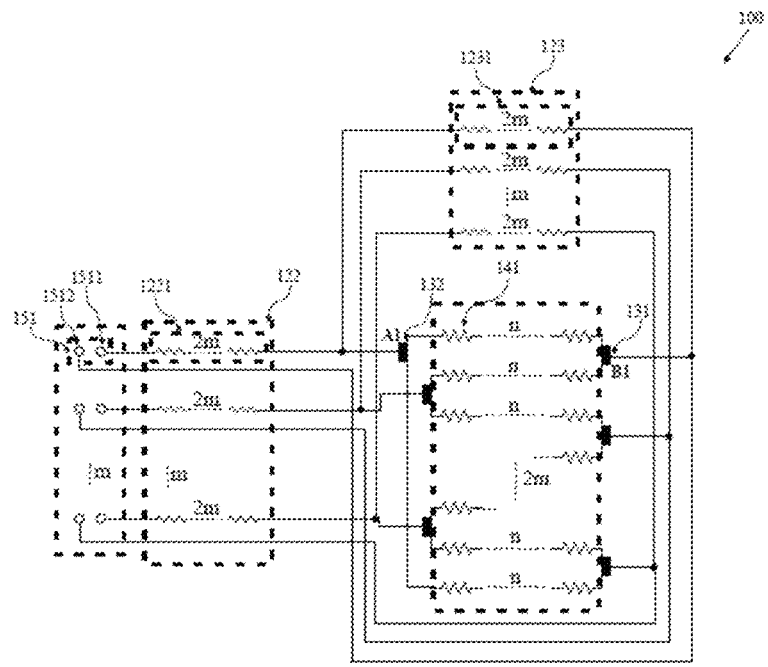
FIG. 31 is a circuit connection diagram of armature windings and field windings of a shunt-series wound direct current motor of the present invention.
Figure 32:
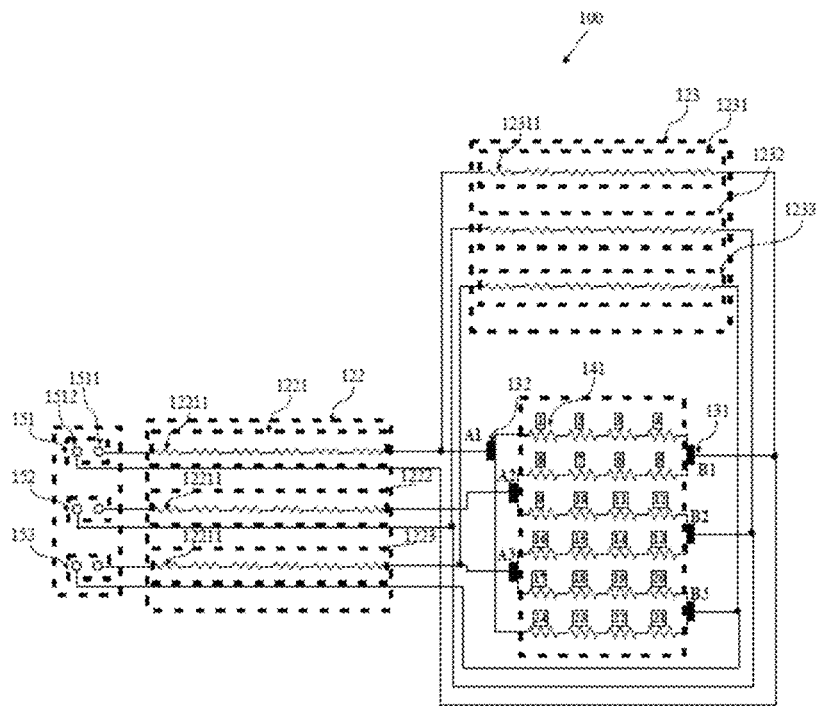
FIG. 32 is a schematic diagram showing circuit connection of armature windings and field windings of a shunt-series wound direct current motor of an embodiment of the present invention.

FIG. 30 is a schematic diagram showing circuit connection in the transversal section structure of a shunt-series wound direct current motor of an embodiment of the present invention; FIG. 31 is a schematic diagram showing circuit connection of armature windings and field windings of a shunt-series wound direct current motor of the present invention; and FIG. 32 is a schematic diagram showing circuit connection of armature windings and field windings of a shunt-series wound direct current motor of an embodiment of the present invention.

In this embodiment, a direct current motor 100 is a shunt-series wound direct current motor, and the shunt-series wound direct current motor is connected to an external direct current power supply (not shown), and has a rated input current corresponding to the external direct current power supply.

As shown in FIGS. 1, 20 and 30, the direct current motor 100 includes a casing 11, a stator 12, brushes 13, a rotor 14, and a junction box (not shown). As shown in FIG. 31, m pairs of brushes are provided according to the value of the rated input current. As shown in FIGS. 32 and 6, m is set to be 3 in this embodiment. If the contact of the transistor power switch can withstand a maximum output current of $I_1$, and the rated input current of the direct current motor is $I_{max}$, then the count of pairs of the brushes, i.e. m, satisfies the following condition: $m > I_{max}/I_1$.

The stator 12 is provided within the casing 11, and includes three pairs (i.e. six in total) of main poles 121, a series field winding part 122, and a shunt field winding part 123; three series field coils 12211 and three shunt field coils 12311 are provided on each main pole 121, and each series field coil 12211 and each shunt field coil 12311 are both formed by winding an insulated conductor strip, which is made of a conductor strip coated with an insulating layer, around the main pole 121. The insulated conductor strip is any one of an enameled wire, and an insulated copper conductor strip, and in this embodiment, the insulated conductor strip is an enameled wire. In this embodiment, the three field coils on each main pole 121 have the same winding direction and number of turns.

As shown in FIGS. 2 and 20, six series field coils 12211, each of which is one of the series field coils 12211 on each main pole 121, are connected to form a series field winding unit 1221 shown in FIG. 32. The field winding part 122 includes three series field winding units 1221. The insulated conductor strip of each series field winding unit 1221 has one series end and the other series end, which are distinguished according to a preset current direction of the series field coils 12211.

Six shunt field coils 12311, each of which is one of the shunt field coils 12311 on each main pole 121, are connected to form a shunt field winding unit 1231 shown in FIG. 32. The shunt field winding part 123 includes three shunt field winding units 1231. The insulated conductor strip of each shunt field winding unit 1231 has one shunt end and the other shunt end, which are distinguished according to a preset current direction of the shunt field coils 12311.

Each pair of main poles includes an S-polarity main pole 1211 and an N-polarity main pole 1212 corresponding to the winding direction of the series field coils 12211 and the preset current direction of the series field coils 12211. The three series field coils 12211 on each main pole have the same winding direction and number of turns, while the three shunt field coils 12311 have the same winding direction and number of turns.

The connection of the six series field coils 12211 of each series field winding unit 1221 is any one of series connection, parallel connection, and series-parallel connection, and the connections of the six series field coils 12211 of all the series field winding units 1221 are identical. In this embodiment, the connection of the six series field coils 12211 is series connection.

The connection of the six shunt field coils 12311 of each shunt field winding unit 1231 is any one of series connection, parallel connection, and series-parallel connection, and the connections of the six shunt field coils 12311 of all the shunt field winding units 1231 are identical. In this embodiment, the connection of the six shunt field coils 12311 is series connection.

As shown in FIGS. 1, 2, 20 and 30, three pairs (i.e. six in total) of brushes 13 are provided within the casing 11, and each pair of brushes 13 includes an S-pole corresponding brush 131 corresponding to the S-polarity main pole 1211, and an N-pole corresponding brush 132 corresponding to the N-polarity main pole 1212, The brushes 13 are any one of narrow brushes or wide brushes, and in this embodiment, the brushes 13 are narrow brushes.

As shown in FIGS. 1, 2, 20 and 30, the rotor 14 is provided within the stator 12, and as shown in FIG. 6, includes a plurality of armature windings 141 in a predetermined connection, and the predetermined connection is any one of simplex lap connection, multiplex lap connection, and multiplex wave connection. In this embodiment, the plurality of armature windings in a simplex lap connection.

The junction box (not shown) is fixed to the casing 11, and as shown in FIGS. 2, 20, 30 and 32, three first external wiring terminals 1511 and three second external wiring terminals 1512 are provided in the junction box, and one first external wiring terminal 1511 and one corresponding second external wiring terminal 1512 constitute a wiring unit 151 (152 or 153). The three wiring units 151, 152 and 153 are correspondingly electrically connected to the other electrode of at least one external direct current power supply (the negative electrode of the direct current power supply), and the direct current power supply is any one of a chopper, a battery and a commutating power supply. In this embodiment, the three wiring units 151 are electrically connected to three chopper power supplies (not shown) in one-to-one correspondence, and all the three choppers have a switching frequency of 1 kHz.

All the one series ends of the insulated conductor strips of the series field winding units are electrically connected to all the S-pole corresponding brushes in the brushes to form joint points; or, all the one series ends of the insulated conductor strips of the series field winding units are electrically connected to all the N-pole corresponding brushes in the brushes to form joint points. In this embodiment, all the one series ends of the insulated conductor strips of the field winding units 1221 are electrically connected to all the S-pole corresponding brushes 131 in the brushes 13.

The three the other series ends of the series field winding units serve as three first external wiring terminals for electrical connection to the external direct current power supply. The three brushes, which are not connected with the one series ends of the series field winding units, are individually provided with wiring terminals serving as three second external wiring terminals for electrical connection to the other electrode of the direct current power supply (the negative electrode of the direct current power supply).

The three one shunt ends of the shunt field winding units are electrically connected to the three second external wiring terminals, while the three the other shunt ends are electrically connected to the electrical joint points of the three series field winding units and the brushes; or, the three one shunt ends of the shunt field winding units are electrically connected to the three second external wiring terminals, while the three the other shunt ends are electrically connected to the three second external wiring terminals, and the three the one shunt ends are electrically connected to the electrical joint points of the three series field winding units and the brushes. In this embodiment, all the one shunt ends of the insulated conductor strips of the shunt field winding units 1231 are electrically connected to all the second external wiring terminals. The three the other shunt ends of the shunt field winding units are electrically connected to the electrical joint points of the three series field winding units and the brushes, and can be electrically connected to the external direct current power supply.

The three first external wiring terminals and the three second external wiring terminals are for electrical connection to the external.

As shown in FIG. 32, in this embodiment, the three one ends of the three series field winding units 1221 are correspondingly electrically connected to the three N-pole corresponding brushes 132 in the six brushes, respectively, the three the other ends of the series field winding units 1221 serve as three first external wiring terminals 1511 for electrical connection to one electrode of the external direct current power supply (for example, the positive electrode of the direct current power supply), the three one ends of the three shunt field winding units 1231 are correspondingly electrically connected to the three N-pole corresponding brushes 132 in the six brushes, respectively, and the three the other ends of the three shunt field winding units 1231 are correspondingly electrically connected to the three S-pole corresponding brushes 131 in the six brushes, respectively, and serve as three second external wiring terminals 1512 for electrical connection to one electrode (the negative electrode of the direct current power supply) of the external direct current power supply. The excitation of the series field winding units and the corresponding three shunt field winding units may be any one of cumulative compound excitation and differential compound excitation, and in this embodiment, is cumulative compound excitation.

Figure 33:
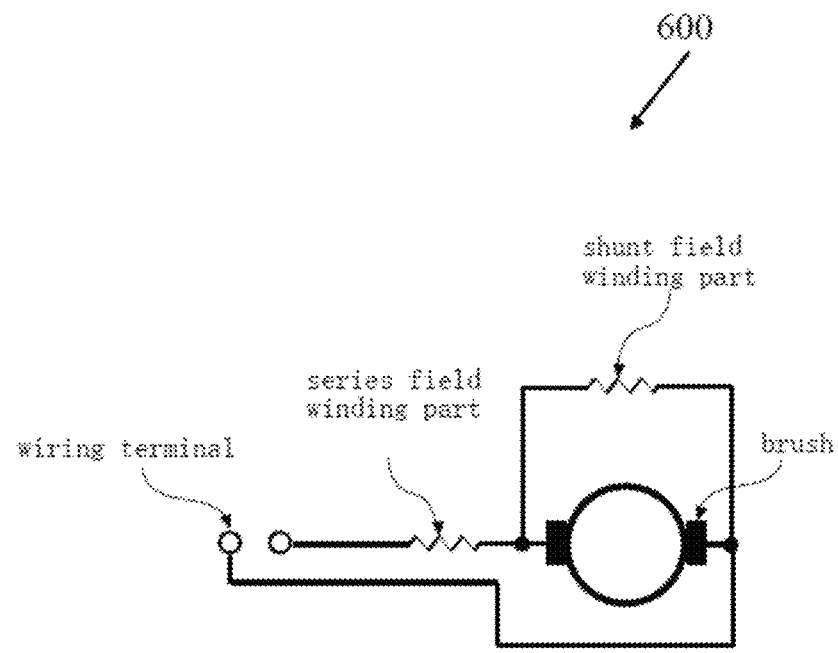
FIG. 33 is a schematic diagram showing circuit connection of a conventional shunt-series wound direct current motor.
Figure 34:
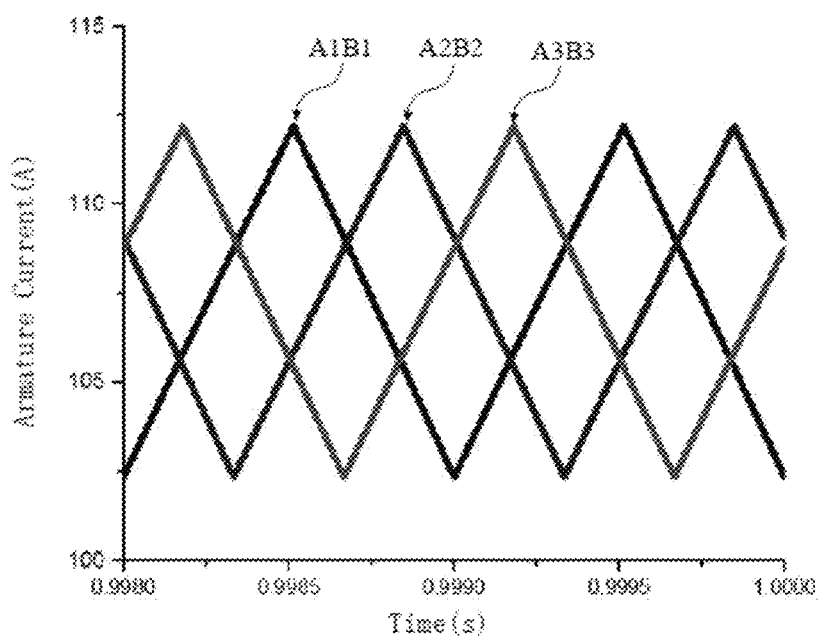
FIG. 34 is a graph showing input current waveforms of three pairs of brushes of a shunt-series wound direct current motor of an embodiment of the present invention.
Figure 35:
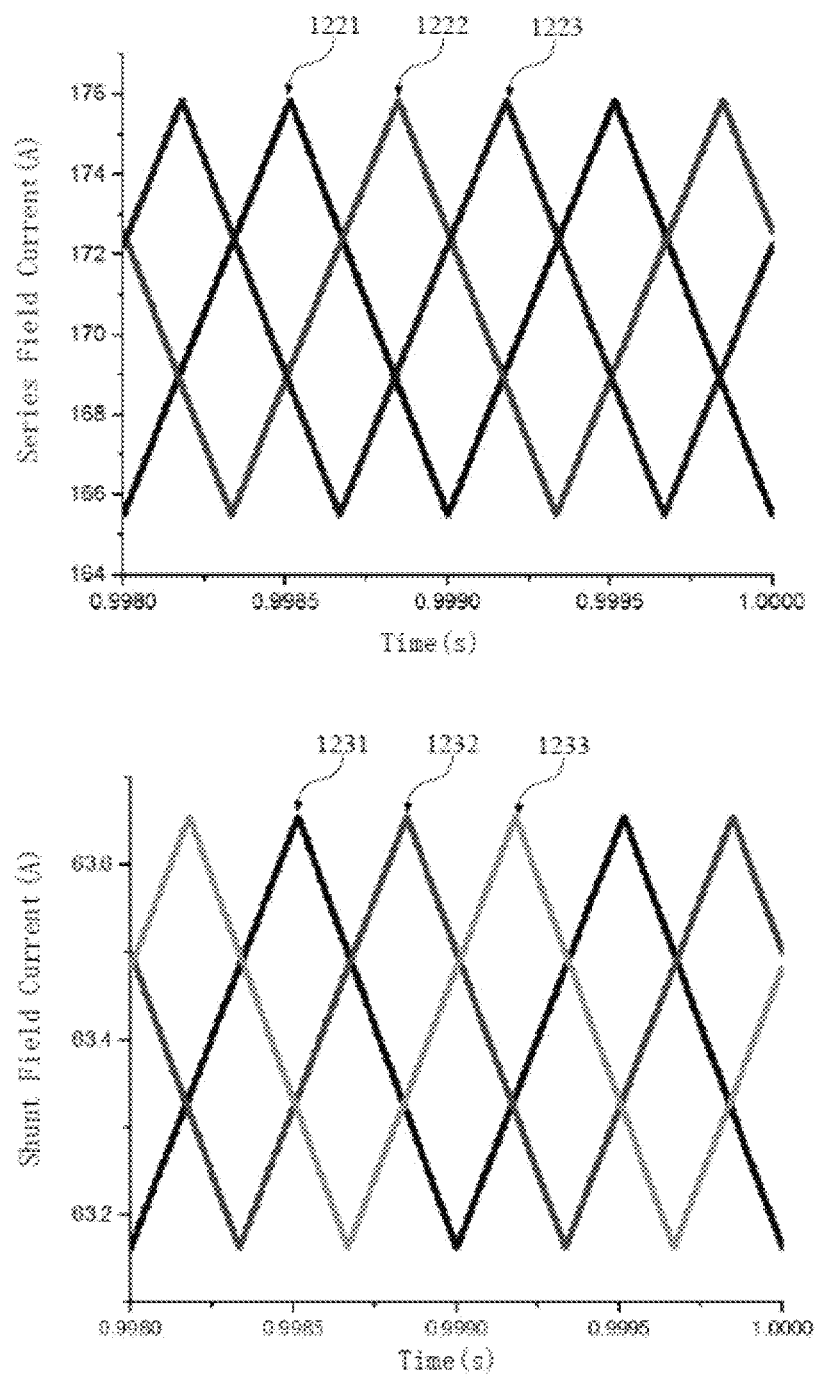
FIG. 35 is a graph showing input current waveforms of three field windings of a shunt-series wound direct current motor of an embodiment of the present invention.
Figure 36:
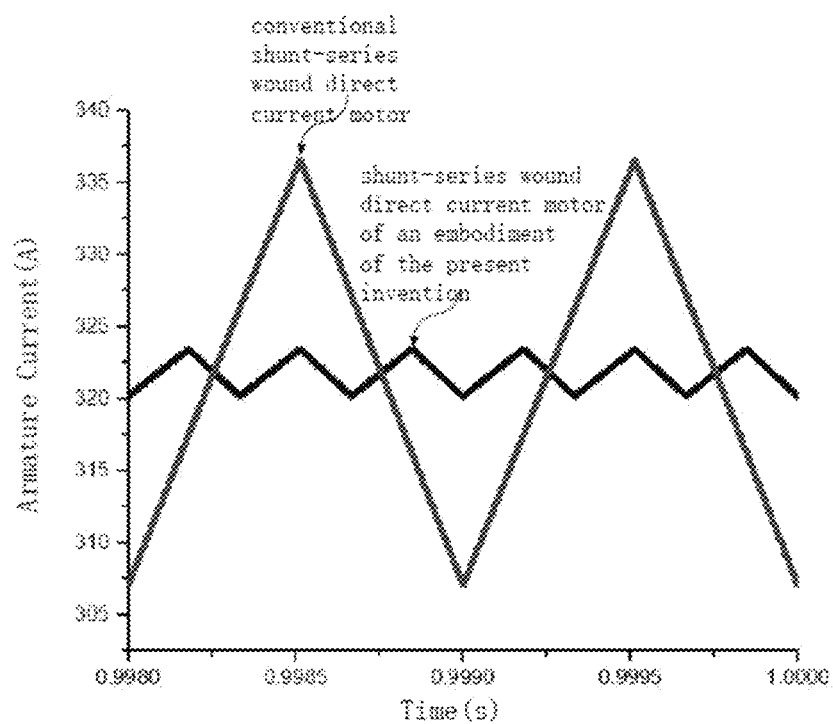
FIG. 36 is a graph comparing the armature current of a shunt-series wound direct current motor of an embodiment of the present invention with that of a conventional shunt-series wound direct current motor.
Figure 37:
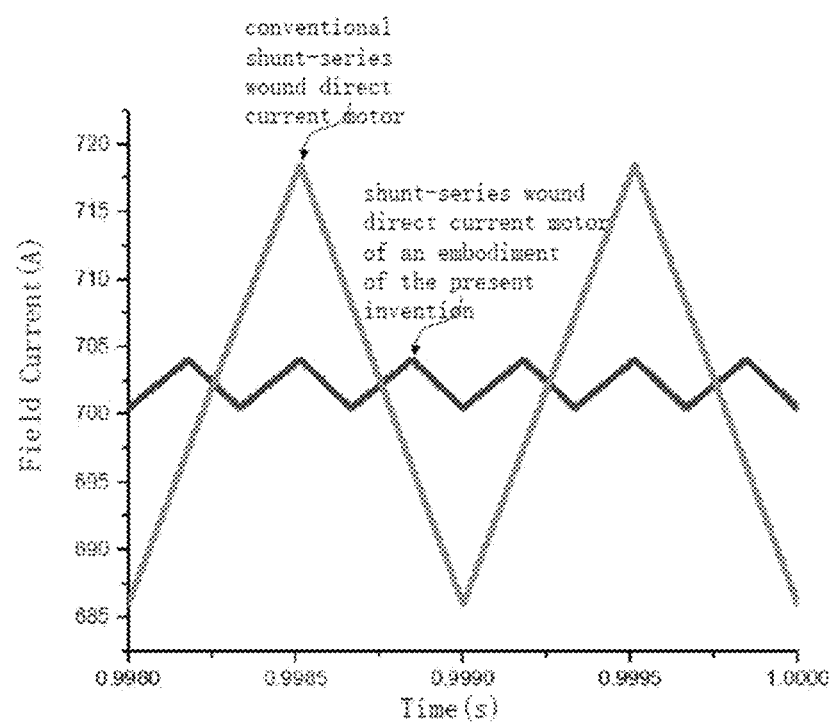
FIG. 37 is a graph comparing the field current of a shunt-series wound direct current motor of an embodiment of the present invention with that of a conventional shunt-series wound direct current motor.
Figure 38:
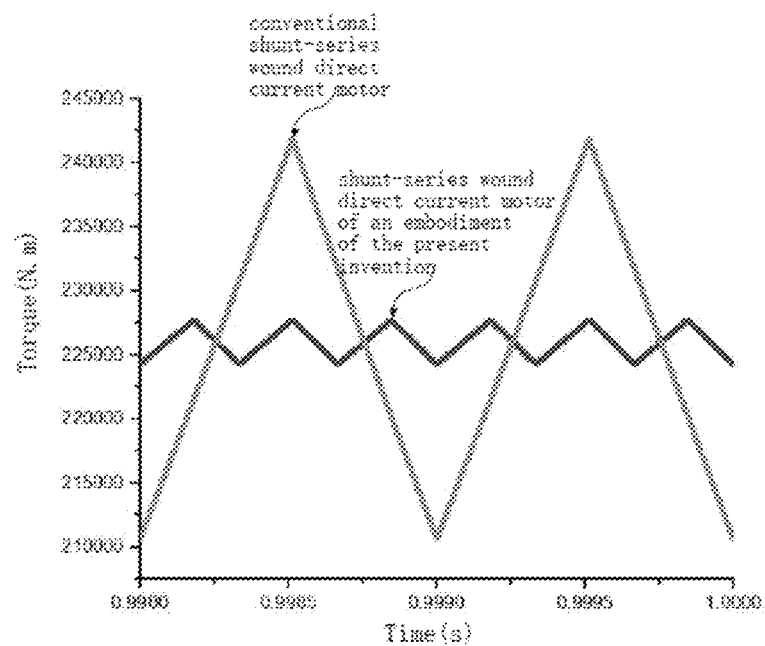
FIG. 38 is a graph comparing the torque of a shunt-series wound direct current motor of an embodiment of the present invention with that of a conventional shunt-series wound direct current motor.

FIG. 33 is a schematic diagram showing circuit connection of a conventional shunt-series wound direct current motor; FIG. 34 is a graph showing input current waveforms of three wiring units of a shunt-series wound direct current motor of an embodiment of the present invention; FIG. 35 is a graph showing input current waveforms of three field windings of a shunt-series wound direct current motor of an embodiment of the present invention; FIG. 36 is a graph comparing the armature current of a shunt-series wound direct current motor of an embodiment of the present invention with that of a conventional shunt-series wound direct current motor; FIG. 37 is a graph comparing the field current of a shunt-series wound direct current motor of an embodiment of the present invention with that of a conventional shunt-series wound direct current motor; and FIG. 38 is a graph comparing the torque of a shunt-series wound direct current motor of an embodiment of the present invention with that of a conventional shunt-series wound direct current motor.

As shown in FIG. 33, a conventional shunt-series wound direct current motor 600 only has one wiring unit, and the wiring unit is correspondingly electrically connected to a chopper power supply (not shown) having a switching frequency of 1 kHz.

In the steady state, the ripple of the current is the difference between the maximum and minimum values, and the ripple coefficient is the ratio, in terms of percentage, of the difference between the maximum and minimum values to the mean value.

As shown in FIG. 34, for the three pairs of brushes A1B1, A2B2 and A3B3 of the shunt-series wound direct current motor of this embodiment, the ripples of the input current are all equal to 112.19−102.35=9.84 amperes, the mean values are all equal to 107.27 amperes, and the ripple coefficients are all equal to 9.84/107.27*100%=9.17%.

As shown in FIG. 35, for the three series field winding units 1221, 1222 and 1223 of the shunt-series wound direct current motor of this embodiment, the ripples of the currents are all equal to 175.85−165.51=10.34 amperes, the mean values are all equal to 170.68 amperes, and the ripple coefficients are all equal to 10.34/170.68*100%=6.06%. For the three shunt field winding units 1231, 1232 and 1233, the ripples of the currents are all equal to 63.66−63.16=0.49 amperes, the mean values are all equal to 63.41 amperes, and the ripple coefficients are all equal to 0.49/63.41*100%=0.78%.

As shown in FIG. 36, in the steady state, for the shunt-series wound direct current motor of this embodiment whose armature current equals to the sum of the currents of the three pairs of brushes A1B1, A2B2 and A3B3, the ripple of the armature current is equal to 323.45−320.18=3.26 amperes, the mean value is equal to 321.82 amperes, and the ripple coefficient is equal to 3.26/321.82*100%=1.01%. For the conventional shunt-series wound direct current motor, the ripple of the armature current is equal to 336.58−307.04=29.55 amperes, the mean value is equal to 321.82 amperes, and the ripple coefficient is 29.55/321.82*100%=9.18%. Although the mean value of the armature current of the shunt-series wound direct current motor of this embodiment is as same as that of the conventional shunt-series wound direct current motor, the ripple and the ripple coefficient of the armature current of the shunt-series wound direct current motor of this embodiment are only ⅑ of those of the conventional shunt-series wound direct current motor.

As shown in FIG. 37, in the steady state, for the shunt-series wound direct current motor of this embodiment whose field current equals to the sum of the currents of the series field winding units 1221, 1222 and 1223 and the three shunt field winding units 1231, 1232 and 1233, the ripple of the field current is equal to 704.06−700.48=3.59 amperes, the mean value is equal to 702.27 amperes, and the ripple coefficient is equal to 3.59/702.27*100%=0.51%. For the conventional shunt-series wound direct current motor, the ripple of the armature current is equal to 718.51−686.01=32.50 amperes, the mean value is equal to 702.27 amperes, and the ripple coefficient is equal to 32.50/702.27*100%=4.63%. Although the mean value of the field current of the shunt-series wound direct current motor of this embodiment is as same as that of the conventional shunt-series wound direct current motor, the ripple and the ripple coefficient of the field current of the shunt-series wound direct current motor of this embodiment are only ⅑ of those of the conventional shunt-series wound direct current motor.

Given that the electromagnetic torque and motion equations of the shunt-series wound direct current motor are as follows $$\begin{cases} T_{em} = C_T \Phi I_a = L_{af} I_f I_a & (1) \\ T_{em} - T_{load} = J \frac{d}{dt} \Omega & (2) \end{cases}$$

where $T_{em}$ is the electromagnetic torque; $C_T$ is the torque constant; $\Phi$ is the magnetic flux of the main magnetic field; $L_{af}$ is the mutual inductance of the field winding part and the armature windings, and is a constant; $I_f$ is the field current; $I_a$ is the armature current; $T_{load}$ is the load torque; J is the load moment of inertia, and is a constant; and $\Omega$ is the output angular velocity.

In this embodiment, the input current of the shunt-series wound direct current motor is equal to the sum of the armature current and the shunt field current and also equal to the series field current, and the rated input current of the shunt-series wound direct current motor is the maximum input current of the motor in the rated operation state.

In the equation (1), the electromagnetic torque $T_{em}$ is directly proportional to the product of the armature current $I_a$ and the magnetic flux $\Phi$ of the main magnetic field, and the main magnetic field of the direct current motor is excited by the field winding part powered by a chopper. It can be seen from the equation (1) that the electromagnetic torque $T_{em}$ is directly proportional to the product of the armature current $I_a$ and the field current $I_f$, and the ripple coefficient of the field current $I_f$ and the ripple coefficient of the armature current $I_a$ will lead to an increased ripple coefficient of the electromagnetic torque $T_{em}$, and increased pulse or ripple of the output angular velocity $\Omega$, resulting in degradation of performance of the driving device and electric equipment.

In this embodiment, $L_{af}$ is equal to 1, and in the steady state, as shown in FIG. 38, for the shunt-series wound direct current of this embodiment, the ripple of the torque of the motor is equal to 227725.80−224281.17=3444.63 N·m, the mean value is equal to 226003.19 N·m, and the ripple coefficient is equal to 3444.63/226003.19=1.52%. For the conventional shunt-series wound direct current motor, the ripple of the torque is equal to 241839.18−210630.99=31208.19 N·m, the mean value is equal to 226082.27 N·m, and the ripple coefficient is equal to 13.80%.

That is to say, although the mean value of the torque of the shunt-series wound direct current motor of this embodiment is as same as that of the conventional shunt-series wound direct current motor, the ripple and the ripple coefficient of the torque of the shunt-series wound direct current motor of this embodiment are only ⅑ of those of the conventional shunt-series wound direct current motor, so that the ripple and the ripple coefficient of the output torque of the motor are reduced, and in turn the ripple and the ripple coefficient of the output speed of the motor are reduced, thereby achieving the purpose of reducing electromagnetic interference, vibration and noises of the motor.

Embodiment 5

Figure 39:
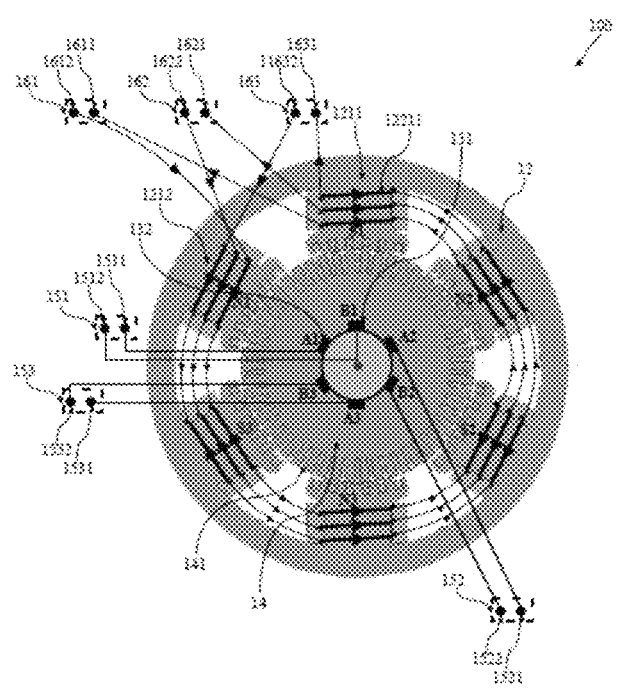
FIG. 39 is a schematic diagram showing circuit connection in the transversal section structure of a separately excited direct current motor of an embodiment of the present invention.
Figure 40:
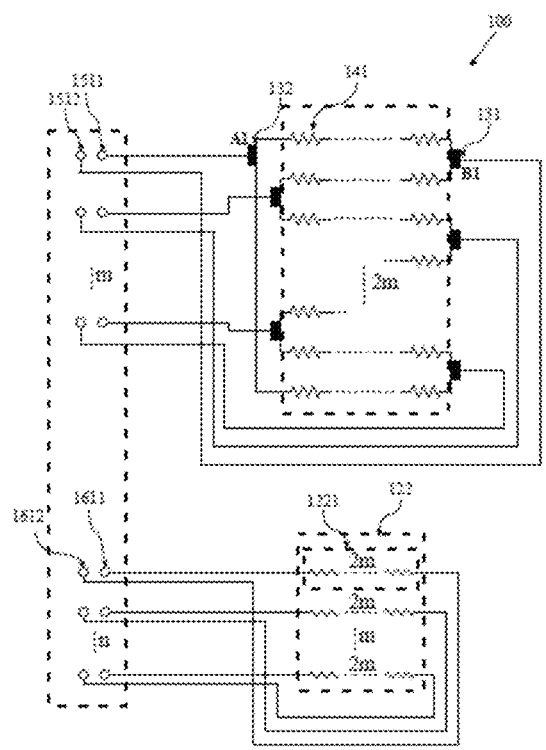
FIG. 40 is a schematic diagram showing circuit connection of armature windings and field windings of a separately excited direct current motor of the present invention.
Figure 41:
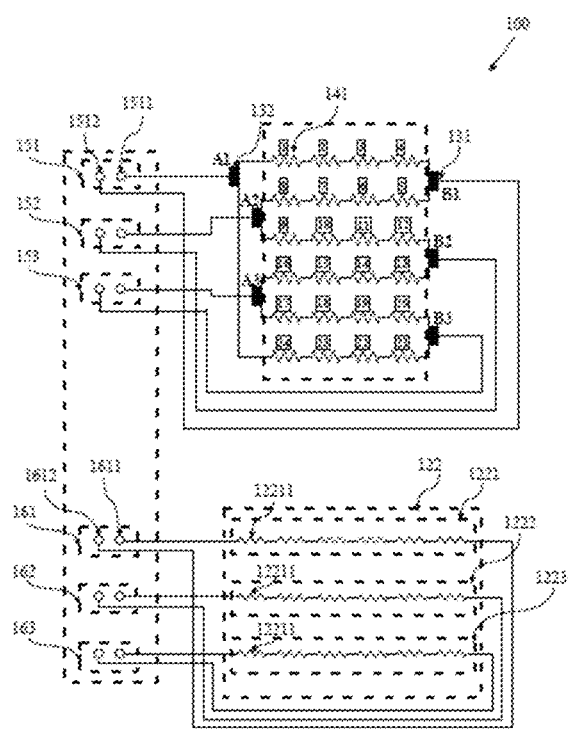
FIG. 41 is a schematic diagram showing circuit connection of armature windings and field windings of a separately excited direct current motor of an embodiment of the present invention.

FIG. 39 is a schematic diagram showing circuit connection in the transversal section structure of a separately excited direct current motor of an embodiment of the present invention; FIG. 40 is a schematic diagram showing circuit connection of armature windings and field windings of a separately excited direct current motor of the present invention; and FIG. 41 is a schematic diagram showing circuit connection of armature windings and field windings of a separately excited direct current motor of an embodiment of the present invention.

In this embodiment, a direct current motor 100 is a separately excited direct current motor, and the separately excited direct current motor is connected to an external first and second direct current power supply (not shown), and has a rated armature current and a rated field current.

As shown in FIGS. 1, 2 and 39, the direct current motor 100 includes a casing 11, a stator 12, brushes 13, a rotor 14, and a junction box (not shown). As shown in FIG. 40, m pairs of brushes are provided according to the value of the rated armature current of the motor. As shown in FIGS. 41 and 6, m is set to be 3 in this embodiment. If the contact of the transistor power switch can withstand a maximum output current of $I_1$, and the rated input current of the direct current motor is $I_{max}$, then the count of pairs of the brushes, i.e. m, satisfies the following condition: m>$I_{max}/I_1$.

The stator 12 is provided within the casing 11, and includes three pairs (i.e. six in total) of main poles 121, and a field winding part 122; three field coils 12211 are provided on each main pole 121, and each field coil 12211 is formed by winding an insulated conductor, which is made of a conductor coated with an insulating layer, around the main pole 121. The insulated conductor strip is any one of an enameled wire, and an insulated copper conductor strip, and in this embodiment, the insulated conductor strip is an enameled wire. In this embodiment, the three field coils 12211 on each main pole 121 have the same winding direction and number of turns.

As shown in FIG. 2, six field coils 12211, each of which is one of the field coils 12211 on each main pole 121, are connected to form a field winding unit 1221 shown in FIG. 41. The field winding part 122 includes three field winding units 1221. The insulated conductor strip of each field winding unit 1221 has one end and the other end, which are distinguished according to a preset current direction of the field coils 12211. Each pair of main poles includes an S-polarity main pole 1211 and an N-polarity main pole 1212 corresponding to the winding direction of the field coils 12211 and the preset current direction of the field coils 12211. In this embodiment, the three field coils 12211 on each main pole 121 have the same winding direction and number of turns.

The connection of the six field coils 12211 of each field winding unit 1221 is any one of series connection, parallel connection, or series-parallel connection, and the connections of the six field coils 12211 of all the field winding units 1221 are identical. In this embodiment, the connection of the six field coils 12211 is a series connection.

As shown in FIGS. 1, 2 and 39, three pairs (i.e. six in total) of brushes 13 are provided within the casing 11, and each pair of brushes 13 includes an S-pole corresponding brush 131 corresponding to the S-polarity main pole 1211, and an N-pole corresponding brush 132 corresponding to the N-polarity main pole 1212.

The brushes 13 are any one of narrow brushes or wide brushes, and in this embodiment, the brushes 13 are narrow brushes.

As shown in FIGS. 1, 2 and 39, the rotor 14 is provided within the stator 12, and as shown in FIG. 5, includes a plurality of armature windings 141 a predetermined connection, and the predetermined connection is any one of simplex lap connection, multiplex lap connection, and multiplex wave connection. In this embodiment, the plurality of armature windings are connected in a manner of in a simplex lap connection.

The junction box (not shown) is fixed to the casing 11, and as shown in FIGS. 2, 39 and 41, three first external wiring terminals 1511, three second external wiring terminals 1512, three third external wiring terminals 1513 and three fourth external wiring terminals 1514 are provided in the junction box. One first external wiring terminal 1511 and one corresponding second external wiring terminal 1512 constitute an armature wiring unit. One third external wiring terminal 1513 and one corresponding fourth external wiring terminal 1514 constitute a field wiring unit. The three armature wiring units are correspondingly electrically connected to at least one first direct current power supply, the three field wiring units are correspondingly electrically connected to at least one second direct current power supply, and the direct current power supply is any one of a chopper, a battery and a commutating power supply. In this embodiment, the three armature wiring units are electrically connected to three chopper power supplies in one-to-one correspondence, the three field wiring units are electrically connected to three chopper power supplies in one-to-one correspondence, and all the three choppers have a switching frequency of 1 kHz.

As shown in FIG. 41, three brushes, corresponding to main poles of the same polarity, in the pairs of brushes serve as three first external wiring terminals 1511 for electrical connection to one electrode of the first direct current power supply (e.g., the positive electrode of the direct current power supply), and the other three brushes in the pairs of brushes serve as three second external wiring terminals 1512 for electrical connection to the other electrode of the first direct current power supply device (e.g., the positive electrode of the DC power supply). The three one ends of the field winding units 1221 serve as three third external wiring terminals 1513 for electrical connection to one electrode of the second direct current power supply (for example, the positive electrode of the direct current power supply), and the three the other ends of the field winding units 1221 serve as three fourth external wiring terminals 1514 for electrical connection to the other electrode of the second direct current power supply (for example, the negative electrode of the direct current power supply).

Figure 42:
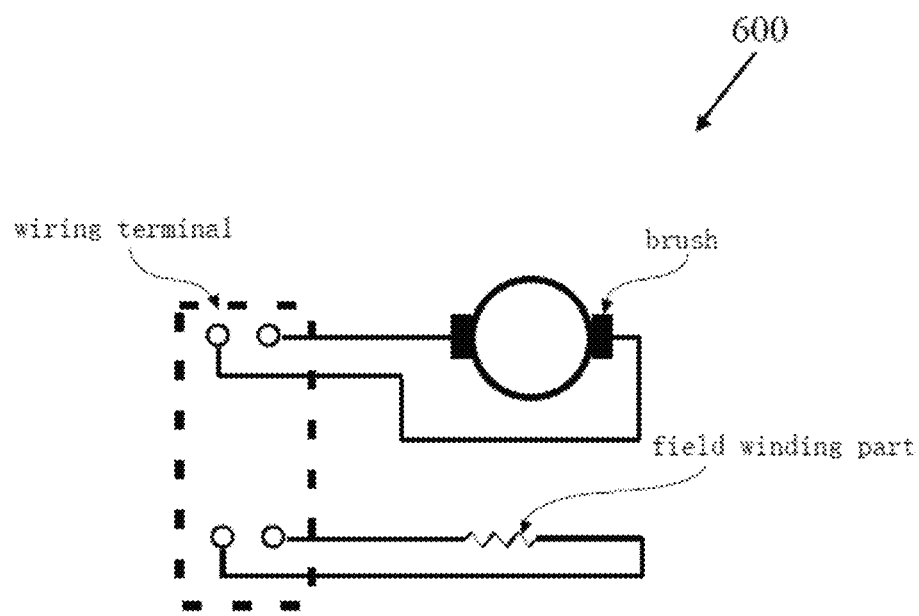
FIG. 42 is a schematic diagram showing circuit connection of a conventional separately excited direct current motor.
Figure 43:
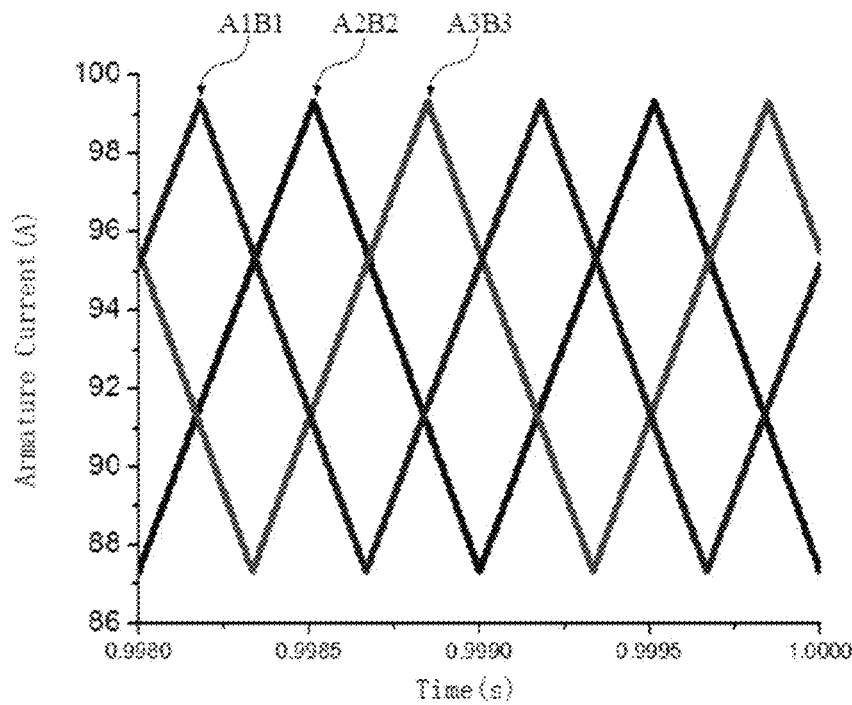
FIG. 43 is a graph showing input current waveforms of three pairs of brushes of a separately excited direct current motor of an embodiment of the present invention.
Figure 44:
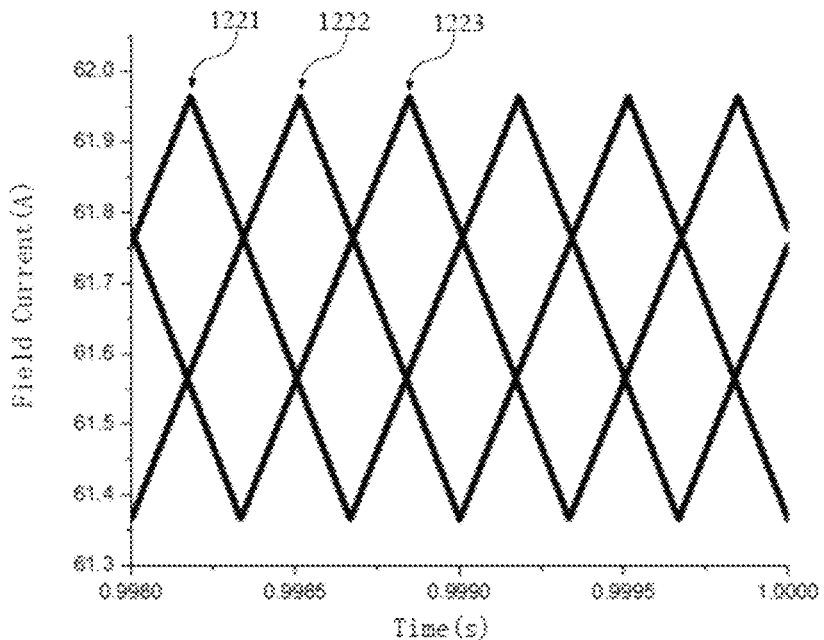
FIG. 44 is a graph showing input current waveforms of three field winding units of a separately excited direct current motor of an embodiment of the present invention.
Figure 45:
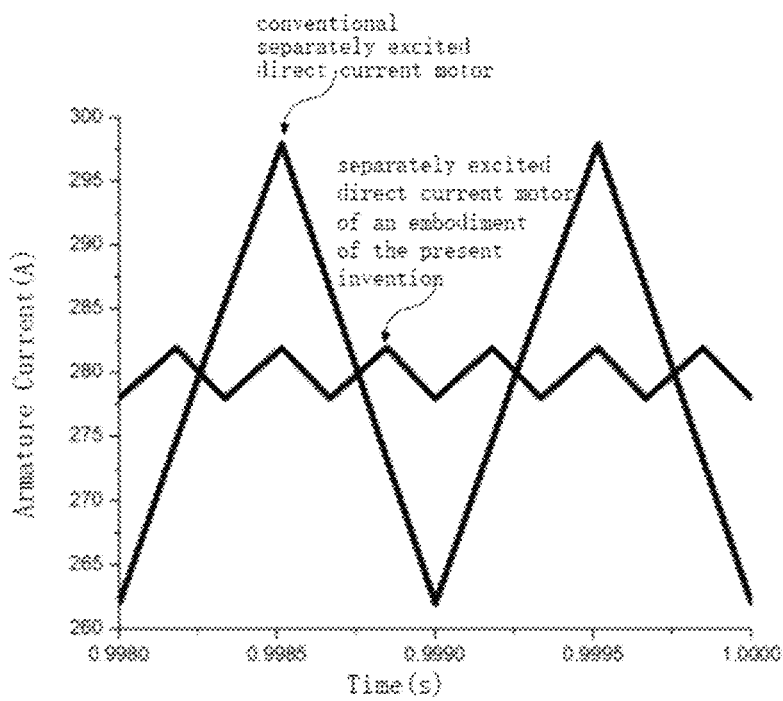
FIG. 45 is a graph comparing the armature current of a separately excited direct current motor of an embodiment of the present invention with that of a conventional separately excited direct current motor.
Figure 46:
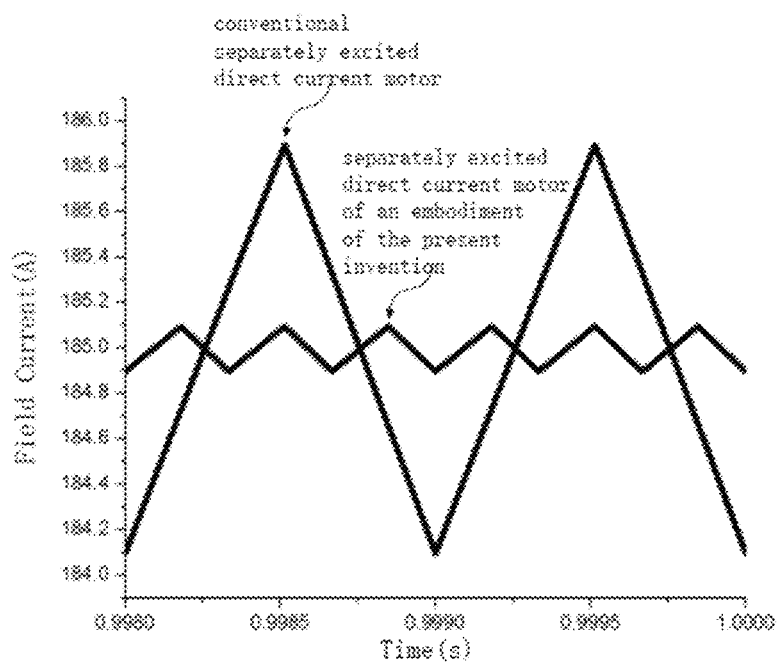
FIG. 46 is a graph comparing the field current of a separately excited direct current motor of an embodiment of the present invention with that of a conventional separately excited direct current motor.
Figure 47:
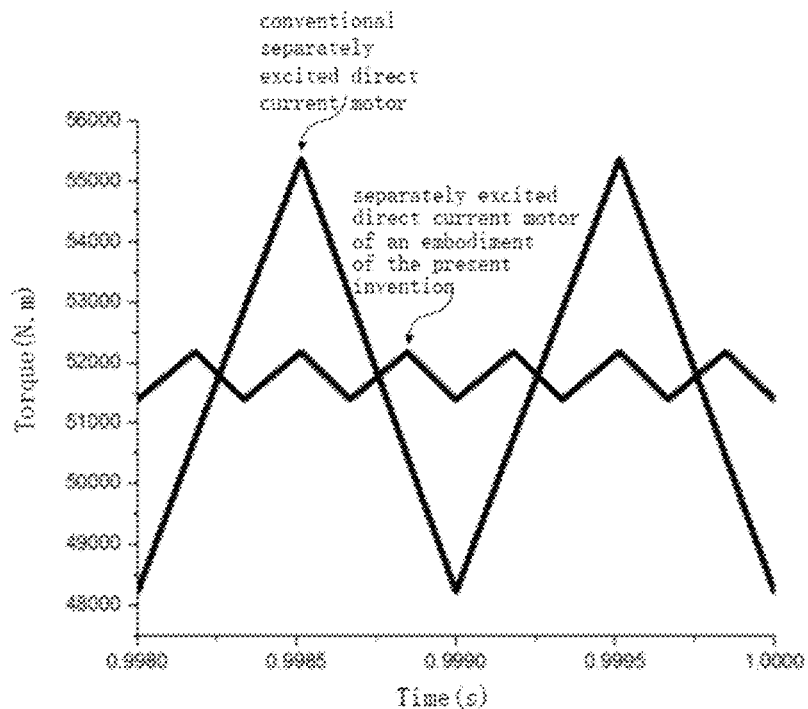
FIG. 47 is a graph comparing the torque of a separately excited direct current motor of an embodiment of the present invention with that of a conventional separately excited direct current motor.

FIG. 42 is a schematic diagram showing circuit connection of a conventional separately excited direct current motor; FIG. 43 is a graph showing input current waveforms of three pairs of brushes of a separately excited direct current motor of an embodiment of the present invention; FIG. 44 is a graph showing input current waveforms of three field winding units of a separately excited direct current motor of an embodiment of the present invention; FIG. 45 is a graph comparing the armature current of a separately excited direct current motor of an embodiment of the present invention with that of a conventional separately excited direct current motor; FIG. 46 is a graph comparing the field current of a separately excited direct current motor of an embodiment of the present invention with that of a conventional separately excited direct current motor; and FIG. 47 is a graph comparing the torque of a separately excited direct current motor of an embodiment of the present invention with that of a conventional separately excited direct current motor.

As shown in FIG. 42, a conventional separately excited direct current motor 600 only has four wiring terminals, and the wiring units are correspondingly electrically connected to two chopper power supplies having a switching frequency of 1 kHz.

In the steady state, the ripple of the current is the difference between the maximum and minimum values, and the ripple coefficient is the ratio, in terms of percentage, of the difference between the maximum and minimum values to the mean value.

As shown in FIG. 43, for the three pairs of brushes A1B1, A2B2 and A3B3 of the separately excited direct current motor of this embodiment, the ripples of the input currents are all equal to 99.31−87.33=11.99 amperes, the mean values are all equal to 93.32 amperes, and the ripple coefficients are all equal to 11.99/93.32*100%=12.84%.

As shown in FIG. 44, for the three field winding units 1221, 1222 and 1223 of the separately excited direct current motor of this embodiment, the input current ripples are all equal to 61.97−61.37=0.60 amperes, the mean values are all equal to 61.67 amperes, and the ripple coefficients are all equal to 0.60/61.67*100%=0.97%.

As shown in FIG. 45, in the steady state, for the separately excited direct current motor of this embodiment whose armature current equals to the sum of the currents of the three pairs of brushes A1B1, A2B2 and A3B3 in FIG. 43, the ripple of the armature current is equal to 281.95−277.98=3.97 amperes, the mean value is equal to 279.97 amperes, and the ripple coefficient is equal to 3.97/279.97*100%=1.42%. For the conventional separately excited direct current motor, the ripple of the armature current is equal to 297.94−261.98=35.96 amperes, the mean value is equal to 279.97 amperes, and the ripple coefficient is 35.96/279.97*100%=12.84%. Although the mean value of the armature current of the separately excited direct current motor of this embodiment is as same as that of the conventional separately excited direct current motor, the ripple and the ripple coefficient of the armature current of the separately excited direct current motor of this embodiment are only ⅑ of those of the conventional separately excited direct current motor.

As shown in FIG. 46, in the steady state, for the separately excited direct current motor of this embodiment whose field current equals to the sum of the currents of the three field winding units 1221, 1222 and 1223 in FIG. 44, the ripple of the field current is equal to 185.10−184.90=0.2 amperes, the mean value is equal to 185.0 amperes, and the ripple coefficient is equal to 0.2/185*100%=0.11%. For the conventional separately excited direct current motor, the ripple of the field current is equal to 185.9−184.1=1.8 amperes, the mean value is equal to 185.0 amperes, and the ripple coefficient is axial to 1.8/185.0*100%=0.97%. Although the mean value of the field current of the separately excited direct current motor of this embodiment is as same as that of the conventional separately excited direct current motor, the ripple and the ripple coefficient of the field current of the separately excited direct current motor of this embodiment are only ⅕ of those of the conventional separately excited direct current motor.

Given that the electromagnetic torque and motion equations of the separately excited direct current motor are as follows $$\begin{cases} T_{em} = C_T \Phi I_a = L_{af} I_f I_a & (1) \\ T_{em} - T_{load} = J \dfrac{d}{dt} \Omega & (2) \end{cases}$$

where $T_{em}$ is the electromagnetic torque; $C_T$ is the torque constant; $\Phi$ is the magnetic flux of the main magnetic field; $L_{af}$ is the mutual inductance of the field winding part and the armature windings, and is a constant; $I_f$ is the field current; $I_a$ is the armature current; $T_{load}$ is the load torque; J is the load moment of inertia, and is a constant; and $\Omega$ is the output angular velocity.

In this embodiment, the input current of the separately excited direct current motor is equal to the armature current, and the rated input current of the separately excited direct current motor is the maximum input current of the motor in the rated operation state.

In the equation (1), the electromagnetic torque $T_{em}$ is directly proportional to the product of the armature current $I_a$ and the magnetic flux $\Phi$ of the main magnetic field, and the main magnetic field of the direct current motor is excited by the field winding part powered by a chopper. It can be seen from the equation (1) that the electromagnetic torque $T_{em}$ is directly proportional to the product of the armature current $I_a$ and the field current $I_f$, and the ripple coefficient of the field current $I_f$ and the ripple coefficient of the armature current $I_a$ will lead to an increased ripple coefficient of the electromagnetic torque $T_{em}$, and increased pulse or ripple of the output angular velocity $\Omega$, resulting in degradation of performance of the driving device and electric equipment.

In this embodiment, $L_{af}$ takes value of 1, and in the steady state, as shown in FIG. 47, for the separately excited direct current of this embodiment, the ripple of the torque of the motor is equal to 52188.25−51398.38=789.87 N·m, the mean value is equal to 51793.56 N·m, and the ripple coefficient is equal to 1.53%. For the conventional separately excited direct current motor, the ripple of the torque is equal to 55386.15−48229.93=7156.21 N·m, the mean value is equal to 51798.89 N·m, and the ripple coefficient is equal to 13.82%.

That is to say, although the mean value of the torque of the separately excited direct current motor of this embodiment is as same as that of the conventional separately excited direct current motor, the ripple and the ripple coefficient of the torque of the separately excited direct current motor of this embodiment are only ⅕ of those of the conventional separately excited direct current motor, so that the ripple and the ripple coefficient of the output torque of the motor are reduced, and in turn the ripple and the ripple coefficient of the output speed of the motor are reduced, thereby achieving the purposes of reducing electromagnetic interference, vibration and noises of the motor and improving the performance of the series wound direct current motor and electric equipment.

Function and Effect of Embodiments

According to the direct current motor provided by Embodiments 1 to 5, each pair of main poles includes an S-polarity main pole and an N-polarity main pole, each pair of brushes includes an S-pole corresponding brush corresponding to the S-polarity main pole, and an N-pole corresponding brush corresponding to the N-polarity main pole, the field winding part includes k field winding units, each field winding unit is made up of field coils formed by winding an insulated conductor strip, which is made of a metal wire coated with an insulating layer, around the m pairs of main poles, and m is a positive integer not less than 2, n is 1 or 2, and k is a positive integer not less than 2, so that each field winding unit is structurally independent and can operate independently, that is: the current in each field winding unit is independent, which allows the current in each field winding units to be similar to and staggered by 1/m of the switching cycle from one another, so as to reduce both the ripple and the ripple coefficient of the sum of the currents of the m field winding units, i.e. the field current of the motor. Therefore, on the one hand, the motor suffers less electromagnetic interference; on the other hand, the ripple and the ripple coefficient of the main magnetic field formed by the m field winding units are both reduced, so that the ripple and the ripple coefficient of the output torque of the motor are reduced, thus reducing the ripple and the ripple coefficient of the output speed of the motor as well as the vibration and noise of the motor.

Moreover, since the current of each field winding unit is independent, when some field winding units break down, other field winding units can still work normally, so that the phenomenon that the conventional direct current motor may suddenly run out of control when a field winding breaks down is prevented, and the reliability and safety of the system are improved.

Further, since the current of each field winding unit is independent and is 1/m of the current of the field winding part, when the field winding part has a large rated current, the current of each field winding unit can be correspondingly reduced as long as m is large enough, so that the requirements on the contact resistance and insulation of wires and connectors connected to the field winding units are lowered, thereby reducing the cost and difficulties in the production and manufacturing, and improving the cost performance, reliability and safety of the system.

In summary, the direct current motor of this embodiment is simple in structure, uses short connecting lines, and is produced by simple procedures, so that it is easy to manufacture and convenient to maintain, and costs less in both production and maintenance, thus having the advantages of reasonable and simple structure design, high reliability, and high safety. Therefore, the direct current motor is not only applicable to heavy-load electric equipment such as electric vehicles, electric trucks, railcars, tourist cars, trucks and ships, but also applicable to high-performance electric equipment such as numerical control machines and submarines.

In addition, in Embodiment 1, a branch formed by each field winding unit and a pair of brushes correspondingly connected thereto is independent of one another, the current of each branch is also independent, and each branch can operate independently and can be independently powered by a pair of power output terminals of a corresponding direct current power supply, that is: each pair of power output terminals only bears the working current of one branch, which is 1/m of the rated input current of the motor, so that the output current waveform of each pair of power output terminals of the direct current power supply is similar to and can be staggered by 1/m of the switching cycle from one another, and the ripple and the ripple coefficient of the sum of the currents of the m pairs of brushes, i.e. the armature current of the motor, are further reduced. Therefore, on the one hand, the motor suffers less electromagnetic interference; on the other hand, the ripple and the ripple coefficient of the output torque of the motor are reduced, thus reducing the ripple and the ripple coefficient of the output speed of the motor as well as the vibration and noise of the motor. Besides, since the branch formed by each field winding unit and a pair of brushes correspondingly connected thereto is independent of one another, when some power output terminals of the direct current power supply and the brushes and wires of the motor break down, other parts can still work normally, so that the phenomenon that the conventional direct current motor may suddenly run out of control due to the breakdown is prevented, and the reliability and safety of the system are further improved. Furthermore, since the branch formed by each field winding unit and a pair of brushes correspondingly connected thereto is independent of one another, for a motor with a large rated input current, the working current of each branch or the output current of each pair of power output terminals can be correspondingly reduced as long as m is large enough, so that when the direct current power supply is a chopper or a commutating power supply, the transistor power switch does not needs a power module or parallel current sharing, thereby reducing the cost; and when the direct current power supply is a battery, the number of parallel branches in the battery is reduced, the battery balance problem caused by parallel connection of multiple battery cells is alleviated, the cost for screening to ensure the consistency of the battery cells is reduced, and overall performance degradation resulted from parallel connection of the battery is reduced, thereby improving the energy density, power, performance, durability and safety of the battery are improved.

In addition, in Embodiment 2, a branch formed by each field winding unit and a pair of brushes correspondingly connected thereto is independent of one another, the current of each branch is also independent, and each branch can operate independently and can be independently powered by a pair of power output terminals of a corresponding direct current power supply, that is: each pair of power output terminals only bears the working current of one branch, which is 1/m of the rated input current of the motor, so that the output current waveform of each pair of power output terminals of the direct current power supply is similar to and can be staggered by 1/m of the switching cycle from one another, and the ripple and the ripple coefficient of the sum of the currents of them pairs of brushes, i.e. the armature current of the motor, are further reduced. Therefore, on the one hand, the motor suffers less electromagnetic interference; on the other hand, the ripple and the ripple coefficient of the output torque of the motor are reduced, thus reducing the ripple and the ripple coefficient of the output speed of the motor as well as the vibration and noise of the motor. Besides, since the branch formed by each field winding unit and a pair of brushes correspondingly connected thereto is independent, when some power output terminals of the direct current power supply and the brushes and wires of the motor break down, other parts can still work normally, so that the phenomenon that the conventional direct current motor may suddenly run out of control due to the breakdown is prevented, and the reliability and safety of the system are further improved. Furthermore, since the branch formed by each field winding unit and a pair of brushes correspondingly connected thereto is independent of one another, for a motor with a large rated input current, the working current of each branch or the output current of each pair of power output terminals can be correspondingly reduced as long as m is large enough, so that when the direct current power supply is a chopper or a commutating power supply, the transistor power switch does not needs a power module or parallel current sharing, thereby reducing the cost; and when the direct current power supply is a battery, the number of parallel branches in the battery is reduced, the battery balance problem caused by parallel connection of multiple battery cells is alleviated, the cost for screening to ensure the consistency of the battery cells is reduced, and overall performance degradation resulted from parallel connection of the battery is reduced, thereby improving the energy density, power, performance, durability and safety of the battery are improved.

In addition, in Embodiment 3, a branch formed by each series field winding unit and a shunt field winding unit of a pair of brushes correspondingly connected thereto is independent of one another, the current of each branch is also independent, and each branch can operate independently and can be independently powered by a pair of power output terminals of a corresponding direct current power supply, that is: each pair of power output terminals only bears the working current of one branch, which is 1/m of the rated input current of the motor, so that the output current waveform of each pair of power output terminals of the direct current power supply is similar to and can be staggered by 1/m of the switching cycle from one another, and the ripple and the ripple coefficient of the sum of the currents of the m pairs of brushes, i.e. the armature current of the motor, are further reduced. Therefore, on the one hand, the motor suffers less electromagnetic interference; on the other hand, the ripple and the ripple coefficient of the output torque of the motor are reduced, thus reducing the ripple and the ripple coefficient of the output speed of the motor as well as the vibration and noise of the motor. Besides, since the branch formed by each series field winding unit and a shunt field winding unit of a pair of brushes correspondingly connected thereto is independent of one another, when some power output terminals of the direct current power supply and the brushes and wires of the motor break down, other parts can still work normally, so that the phenomenon that the conventional direct current motor may suddenly run out of control due to the breakdown is prevented, and the reliability and safety of the system are further improved. Furthermore, since the branch formed by each series field winding unit and a shunt field winding unit of a pair of brushes correspondingly connected thereto is independent of one another, for a motor with a large rated input current, the working current of each branch or the output current of each pair of power output terminals can be correspondingly reduced as long as m is large enough, so that when the direct current power supply is a chopper or a commutating power supply, the transistor power switch does not needs a power module or parallel current sharing, thereby reducing the cost; and when the direct current power supply is a battery, the number of parallel branches in the battery is reduced, the battery balance problem caused by parallel connection of multiple battery cells is alleviated, the cost for screening to ensure the consistency of the battery cells is reduced, and overall performance degradation resulted from parallel connection of the battery is reduced, thereby improving the energy density, power, performance, durability and safety of the battery are improved.

In addition, in Embodiment 4, a branch formed by each shunt field winding unit and a pair of brushes, which are firstly connected in parallel, and a series field winding unit, which is then connected in series, is independent of one another, the current of each branch is also independent, and each branch can operate independently and can be independently powered by a pair of power output terminals of a corresponding direct current power supply, that is: each pair of power output terminals only bears the working current of one branch, which is 1/m of the rated input current of the motor, so that the output current waveform of each pair of power output terminals of the direct current power supply is similar to and can be staggered by 1/m of the switching cycle from one another, and the ripple and the ripple coefficient of the sum of the currents of the m pairs of brushes, i.e. the armature current of the motor, are further reduced. Therefore, on the one hand, the motor suffers less electromagnetic interference; on the other hand, the ripple and the ripple coefficient of the output torque of the motor are reduced, thus reducing the ripple and the ripple coefficient of the output speed of the motor as well as the vibration and noise of the motor. Besides, since the branch formed by each shunt field winding unit and a pair of brushes, which are firstly connected in parallel, and a series field winding unit, which is then connected in series, is independent of one another, when some power output terminals of the direct current power supply and the brushes and wires of the motor break down, other parts can still work normally, so that the phenomenon that the conventional direct current motor may suddenly run out of control due to the breakdown is prevented, and the reliability and safety of the system are further improved. Furthermore, since the branch formed by each shunt field winding unit and a pair of brushes, which are firstly connected in parallel, and a series field winding unit, which is then connected in series, is independent of one another, for a motor with a large rated input current, the working current of each branch or the output current of each pair of power output terminals can be correspondingly reduced as long as m is large enough, so that when the direct current power supply is a chopper or a commutating power supply, the transistor power switch does not needs a power module or parallel current sharing, thereby reducing the cost; and when the direct current power supply is a battery, the number of parallel branches in the battery is reduced, the battery balance problem caused by parallel connection of multiple battery cells is alleviated, the cost for screening to ensure the consistency of the battery cells is reduced, and overall performance degradation resulted from parallel connection of the battery is reduced, thereby improving the energy density, power, performance, durability and safety of the battery are improved.

In addition, in Embodiment 5, an armature branch formed by each pair of brushes and a field branch formed by each field winding unit are both independent of one another, while each armature branch and each field branch are independent from each other, the current of each branch is also independent, and each branch can operate independently and can be independently powered by a pair of power output terminals of a corresponding direct current power supply, that is: each pair of power output terminals only bears the working current of one branch, which is 1/m of the rated input current of the motor, so that the output current waveform of each pair of power output terminals of the direct current power supply is similar to and can be staggered by 1/m of the switching cycle from one another, and the ripple and the ripple coefficient of the sum of the currents of them pairs of brushes, i.e. the armature current of the motor, are further reduced. Therefore, on the one hand, the motor suffers less electromagnetic interference; on the other hand, the ripple and the ripple coefficient of the output torque of the motor are reduced, thus reducing the ripple and the ripple coefficient of the output speed of the motor as well as the vibration and noise of the motor. Besides, since the armature branch formed by each pair of brushes and a field branch formed by each field winding unit are both independent of one another, while each armature branch and each field branch are independent from each other, when some power output terminals of the direct current power supply and the brushes and wires of the motor break down, other parts can still work normally, so that the phenomenon that the conventional direct current motor may suddenly run out of control due to the breakdown is prevented, and the reliability and safety of the system are further improved. Furthermore, since the armature branch formed by each pair of brushes and a field branch formed by each field winding unit are both independent of one another, while each armature branch and each field branch are independent from each other, for a motor with a large rated input current, the working current of each branch or the output current of each pair of power output terminals can be correspondingly reduced as long as m is large enough, so that when the direct current power supply is a chopper or a commutating power supply, the transistor power switch does not needs a power module or parallel current sharing, thereby reducing the cost; and when the direct current power supply is a battery, the number of parallel branches in the battery is reduced, the battery balance problem caused by parallel connection of multiple battery cells is alleviated, the cost for screening to ensure the consistency of the battery cells is reduced, and overall performance degradation resulted from parallel connection of the battery is reduced, thereby improving the energy density, power, performance, durability and safety of the battery are improved.

The foregoing shows and describes the basic principles, main features and advantages of the present invention. It should be understood by those skilled in the art that the present invention is not limited to the above-described embodiments, and that the above-described embodiments and descriptions are merely illustrative of the principles of the invention, and that various changes and modifications may be made thereto without departing from the spirit and scope of the invention, which fall within the scope of the appended claims. The scope of the invention is defined by the appended claims and their equivalents.

The invention claimed is:

1. A direct current motor, connected to at least one direct current power supply, characterized by comprising:
   a casing;
   m pairs of brushes fixed within the casing;
   a stator provided within the casing, including m main poles corresponding to the m pairs of brushes, and n field winding parts; and a rotor provided within the stator, including a plurality of armature windings in a predetermined connection, wherein each pair of main poles includes an S-polarity main pole and an N-polarity main pole, each pair of brushes includes an S-pole corresponding brush corresponding to the S-polarity main pole, and an N-pole corresponding brush corresponding to the N-polarity main pole, the field winding part includes k field winding units, each field winding unit is made up of field coils formed by winding an insulated conductor strip, which is made of a metal wire coated with an insulating layer, around the m pairs of main poles, m is a positive integer not less than 2, n is 1 or 2, and k is a positive integer not less than 2, when n is 1 and k=m, the insulated conductor strip of each field winding unit has one end and the other end, all the one ends of the insulated conductor strips are electrically connected to all the S-pole corresponding brushes in the brushes; or, all the one ends of the insulated conductor strips are electrically connected to all the N-pole corresponding brushes in the brushes, the m the other ends of the insulated conductor strips serve as m first external wiring terminals for electrical connection to the external, and the m brushes, which are not connected with the one ends of the insulated conductor strips, are individually provided with wiring terminals serving as m second external wiring terminals for electrical connection to the external.

2. The direct current motor of claim 1, characterized in that, all the field coils on each main pole have the same number of turns.

3. The direct current motor of claim 1, characterized in that, the connection of the multiple field coils of each field winding unit is any one of series connection, parallel connection, and series-parallel connection, and the connections of the multiple field coils of all the field winding units are identical.

4. A direct current motor, connected to at least one direct current power supply, characterized by comprising:

a casing;

m pairs of brushes fixed within the casing;

a stator provided within the casing, including m main poles corresponding to the m pairs of brushes, and n field winding parts; and a rotor provided within the stator, including a plurality of armature windings in a predetermined connection, wherein each pair of main poles includes an S-polarity main pole and an N-polarity main pole, each pair of brushes includes an S-pole corresponding brush corresponding to the S-polarity main pole, and an N-pole corresponding brush corresponding to the N-polarity main pole, the field winding part includes k field winding units, each field winding unit is made up of field coils formed by winding an insulated conductor strip, which is made of a metal wire coated with an insulating layer, around the m pairs of main poles, m is a positive integer not less than 2, n is 1 or 2, and k is a positive integer not less than 2, when n is 1 and k=m, the insulated conductor strip of each field winding unit has one end and the other end, all the one ends of the insulated conductor strips are electrically connected to all the S-pole corresponding brushes in the brushes to form first external wiring terminals, while all the other ends are electrically connected to all the N-pole corresponding brushes in the brushes to form second external wiring terminals; or, all the one ends of the insulated conductor strips are electrically connected to all the N-pole corresponding brushes in the brushes to form first external wiring terminals, while all the other ends are electrically connected to all the S-pole corresponding brushes in the brushes to form second external wiring terminals, and the m first external wiring terminals and the m second external wiring terminals are for electrical connection to two electrodes of the direct current power supply, respectively.

5. The direct current motor of claim 4, characterized in that, all the field coils on each main pole have the same number of turns.

6. The direct current motor of claim 4, characterized in that, the connection of the multiple field coils of each field winding unit is any one of series connection, parallel connection, and series-parallel connection, and the connections of the multiple field coils of all the field winding units are identical.

7. A direct current motor, connected to at least one direct current power supply, characterized by comprising:

a casing;

m pairs of brushes fixed within the casing;

a stator provided within the casing, including m main poles corresponding to the m pairs of brushes, and n field winding parts; and a rotor provided within the stator, including a plurality of armature windings in a predetermined connection, wherein each pair of main poles includes an S-polarity main pole and an N-polarity main pole, each pair of brushes includes an S-pole corresponding brush corresponding to the S-polarity main pole, and an N-pole corresponding brush corresponding to the N-polarity main pole, the field winding part includes k field winding units, each field winding unit is made up of field coils formed by winding an insulated conductor strip, which is made of a metal wire coated with an insulating layer, around the m pairs of main poles, m is a positive integer not less than 2, n is 1 or 2, and k is a positive integer not less than 2, when n is 2 and k=m, the stator includes a series field winding part and a shunt field winding part, the series field winding part includes m series field winding units, the shunt field winding part includes m shunt field winding units, each series field winding unit is made up of series field coils made with the insulated conductor strip, each shunt field winding unit is made up of shunt field coils made with the insulated conductor strip, the insulated conductor strip of each series field winding unit has one series end and the other series end, the insulated conductor strip of each shunt field winding unit has one shunt end and the other shunt end, all the one ends of the insulated conductor strips are electrically connected to all the S-pole corresponding brushes in the brushes; or, all the one ends of the insulated conductor strips are electrically connected to all the N-pole corresponding brushes in the brushes, the m one series ends of the series field winding units serve as m first external wiring terminals for electrical connection to one electrode of the external direct current power supply, the m brushes, which are not connected with the one series ends of the series field winding units, are individually provided with wiring terminals serving as m second external wiring terminals for electrical connection to the other electrode of the external direct current power supply, and the m one shunt ends of the shunt field winding units are electrically connected to the m first external wiring terminals, while the m the other shunt ends are electrically connected to the m second external wiring terminals; or, the m one shunt ends of the shunt field winding units are electrically connected to the m second external wiring terminals, while the m the other shunt ends are electrically connected to the m first external wiring terminals.

8. The direct current motor of claim 7, characterized in that, the series field coils of the series field winding units on each main pole have the same winding direction and number of turns, and the shunt field coils of the shunt field winding units on each main pole have the same winding direction and number of turns.

9. The direct current motor of claim 7, characterized in that, the connection of the multiple series field coils of each series field is any one of series connection, parallel connection, and series-parallel connection, the connections of the multiple series field coils of all the series field winding units are identical, the connection of the multiple shunt field coils of each shunt field winding unit is any one of series connection, parallel connection, and series-parallel connection, and the connections of the multiple shunt field coils of all the shunt field winding units are identical.

10. A direct current motor, connected to at least one direct current power supply, characterized by comprising:

a casing;

m pairs of brushes fixed within the casing;

a stator provided within the casing, including m main poles corresponding to the m pairs of brushes, and n field winding parts; and a rotor provided within the stator, including a plurality of armature windings in a predetermined connection, wherein each pair of main poles includes an S-polarity main pole and an N-polarity main pole, each pair of brushes includes an S-pole corresponding brush corresponding to the S-polarity main pole, and an N-pole corresponding brush corresponding to the N-polarity main pole, the field winding part includes k field winding units, each field winding unit is made up of field coils formed by winding an insulated conductor strip, which is made of a metal wire coated with an insulating layer, around the m pairs of main poles, m is a positive integer not less than 2, n is 1 or 2, and k is a positive integer not less than 2, when n is 2 and k=m, the stator includes a series field winding part and a shunt field winding part, the series field winding part includes m series field winding units, the shunt field winding part includes m shunt field winding units, each series field winding unit is made up of series field coils made with the insulated conductor strip, each shunt field winding unit is made up of shunt field coils made with the insulated conductor strip, the insulated conductor strip of each series field winding unit has one series end and the other series end, the insulated conductor strip of each shunt field winding unit has one shunt end and the other shunt end, all the one series ends of the series field winding units are electrically connected to all the S-pole corresponding brushes in the brushes to form joint points; or, all the one series ends of the series field winding units are electrically connected to all the N-pole corresponding brushes in the brushes to form joint points, the m the other series ends of the series field winding units serve as m first external wiring terminals for electrical connection to one electrode of the external direct current power supply, the m brushes, which are not connected with the one series ends of the series field winding units, are individually provided with wiring terminals serving as m second external wiring terminals for electrical connection to the other electrode of the external direct current power supply, and the m one shunt ends of the shunt field winding units are electrically connected to the m second external wiring terminals, while the m the other shunt ends are electrically connected to the electrical joint points of the m series field winding units and the brushes; or, the m the other shunt ends of the shunt field winding units are electrically connected to the m second external wiring terminals, while the m one shunt ends are electrically connected to the electrical joint points of the m series field winding units and the brushes.

11. The direct current motor of claim 10, characterized in that, the series field coils of the series field winding units on each main pole have the same winding direction and number of turns, and the shunt field coils of the shunt field winding units on each main pole have the same winding direction and number of turns.

12. The direct current motor of claim 10, characterized in that, the connection of the multiple series field coils of each series field is any one of series connection, parallel connection, and series-parallel connection, the connections of the multiple series field coils of all the series field winding units are identical, the connection of the multiple shunt field coils of each shunt field winding unit is any one of series connection, parallel connection, and series-parallel connection, and the connections of the multiple shunt field coils of all the shunt field winding units are identical.

13. A direct current motor, connected to at least one direct current power supply, characterized by comprising:

a casing;

m pairs of brushes fixed within the casing;

a stator provided within the casing, including m main poles corresponding to the m pairs of brushes, and n field winding parts; and a rotor provided within the stator, including a plurality of armature windings in a predetermined connection, wherein each pair of main poles includes an S-polarity main pole and an N-polarity main pole, each pair of brushes includes an S-pole corresponding brush corresponding to the S-polarity main pole, and an N-pole corresponding brush corresponding to the N-polarity main pole, the field winding part includes k field winding units, each field winding unit is made up of field coils formed by winding an insulated conductor strip, which is made of a metal wire coated with an insulating layer, around the m pairs of main poles, m is a positive integer not less than 2, n is 1 or 2, and k is a positive integer not less than 2, the direct current power supply includes at least one first direct current power supply and at least one second direct current power supply, when n is 1, the insulated conductor strip of each field winding unit has one end and the other end, all the S-pole corresponding brushes or all the N-pole corresponding brushes are individually provided with wiring terminals serving as m first external wiring terminals for electrical connection to one electrode of the first direct current power supply, the rest of the brushes, which are not electrically connected with the first external wiring terminals, are individually provided with wiring terminals serving as m second external wiring terminals for electrical connection to the other electrode of the first direct current power supply, all the one ends of the insulating conductor strips serve as k third external wiring terminals for electrical connection to the one electrode of the second direct current power supply, and all the other ends of the insulated conductor strips serve as k fourth external wiring terminals for electrical connection to the other electrode of the second direct current power supply.

14. The direct current motor of claim 13, characterized in that, all the field coils on each main pole have the same winding direction and number of turns.

15. The direct current motor of claim 13, characterized in that, the connection of the multiple field coils of each field winding unit is any one of series connection, parallel connection, and series-parallel connection, and the connections of the multiple field coils of all the field winding units are identical.

* * * * *